(12) United States Patent
Cunliffe

(10) Patent No.: US 11,882,614 B2
(45) Date of Patent: Jan. 23, 2024

(54) AUTONOMOUS AND RESILIENT INTEGRATED CIRCUIT DEVICE

(71) Applicant: CSL DualCom Limited, Watford (GB)

(72) Inventor: Richard Benjamin Cunliffe, Watford (GB)

(73) Assignee: CSL DualCom Limited, Watford (GB)

( * ) Notice: Subject to any disclaimer, the term of this patent is extended or adjusted under 35 U.S.C. 154(b) by 0 days.

(21) Appl. No.: 17/773,268

(22) PCT Filed: Feb. 16, 2021

(86) PCT No.: PCT/GB2021/050371
§ 371 (c)(1),
(2) Date: Apr. 29, 2022

(87) PCT Pub. No.: WO2021/170974
PCT Pub. Date: Sep. 2, 2021

(65) Prior Publication Data
US 2023/0121282 A1  Apr. 20, 2023

(30) Foreign Application Priority Data

Feb. 25, 2020 (GB) ..................................... 2002663
Oct. 5, 2020 (GB) ..................................... 2015759

(51) Int. Cl.
| | | |
|---|---|---|
| *H04L 29/08* | (2006.01) | |
| *H04L 29/06* | (2006.01) | |
| *H04W 76/19* | (2018.01) | |
| *H04W 8/18* | (2009.01) | |

(52) U.S. Cl.
CPC ........... *H04W 76/19* (2018.02); *H04W 8/183* (2013.01)

(58) Field of Classification Search
None
See application file for complete search history.

(56) References Cited

U.S. PATENT DOCUMENTS

| | | |
|---|---|---|
| 9,215,547 B2 | 12/2015 | Marsden et al. |
| 9,549,310 B2 | 1/2017 | Marshall et al. |
| | (Continued) | |

FOREIGN PATENT DOCUMENTS

| | | |
|---|---|---|
| CN | 109041174 A | 12/2018 |
| GB | 2504968 A | 2/2014 |
| | (Continued) | |

OTHER PUBLICATIONS

3rd Generation Partnership Project: Technical Specification Group Services and Systems Aspects; General Universal Mobile Telecommunications System (UMTS) architecture (Release 15); 3GPP TS 23.101 V15.0.0 (Jun. 2018): 14 pages (2018).

(Continued)

*Primary Examiner* — Gary Lafontant
(74) *Attorney, Agent, or Firm* — Erik A. Huestis; Sameer K. Pai; Foley Hoag LLP

(57) ABSTRACT

There is provided a universal integrated circuit card (UICC) for controlling radio communications via a radio communications network to and from a host device in which the UICC is installed in use, the UICC comprising: a microprocessor for controlling the operation of the UICC; a data store for storing data relating to the operation of the UICC, the data store comprising: a plurality of mobile operator network profiles including: an operational profile comprising radio communications network settings for connecting the host device to a first radio communications network; and a bootstrap profile comprising radio communications network settings for connecting the host device to a second radio communications network; and a program comprising a plurality of instructions for configuring operation of the UICC; wherein, in use, the microprocessor is configured by the program to: use the operational profile to connect the host device to the first radio communications network; detect a (Continued)

loss of operational connectivity with the first radio communications network; and use the bootstrap profile to connect the host device to the second radio communications network to re-establish radio communications to and from the host device. There is further provided a host device comprising a processor having a memory, a radio module for connecting the host device to a radio communications network, and the universal integrated circuit device. There is further provided a method of operating a UICC, and a computer-implemented method of re-establishing a radio communications network connection between a host device and a network platform providing the radio communications network connection, wherein the host device includes a UICC.

26 Claims, 22 Drawing Sheets

(56) References Cited

U.S. PATENT DOCUMENTS

| | | |
|---|---|---|
| 11,523,269 B2 | 12/2022 | Bouskila et al. |
| 11,627,448 B2 | 4/2023 | Bouskila |
| 11,653,282 B2 | 5/2023 | Malatack |
| 2015/0256511 A1 | 9/2015 | Gupta |
| 2019/0281513 A1 | 9/2019 | Rahman |
| 2021/0144228 A1* | 5/2021 | Chastain ............... H04L 67/303 |
| 2022/0116763 A1 | 4/2022 | Bouskila et al. |
| 2022/0131815 A1 | 4/2022 | Bezalel |
| 2023/0121282 A1 | 4/2023 | Cunliffe |
| 2023/0208984 A1 | 6/2023 | Chaudhary et al. |

FOREIGN PATENT DOCUMENTS

| | | |
|---|---|---|
| WO | WO-2003/075588 A1 | 9/2003 |
| WO | WO-2013/093440 A1 | 6/2013 |
| WO | WO-2016/185293 A1 | 11/2016 |
| WO | WO-2017/082966 A1 | 5/2017 |
| WO | WO-2021/170974 A2 | 9/2021 |

OTHER PUBLICATIONS

International Search Report and Written Opinion for International Application No. PCT/GB2021/050371 dated Sep. 24, 2021.
United Kingdom Combined Search and Examination Report under Sections 17 & 18(3) for Application No. GB2015759.0 dated Feb. 25, 2022.

* cited by examiner

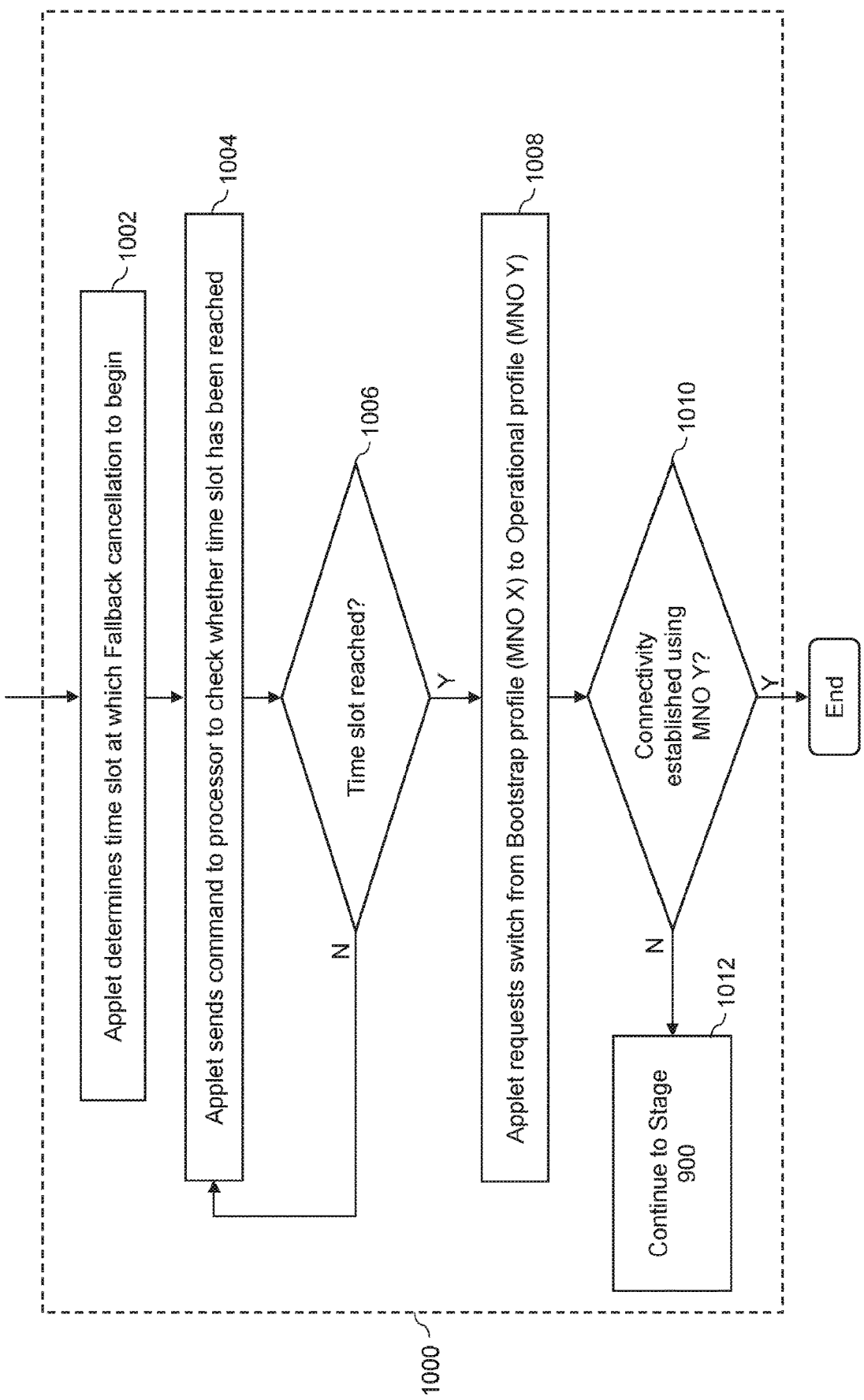

| Timings | Description | Profile Type | |
|---|---|---|---|
| | | Domestic | Roaming |
| N | Number of failed ping sequence attempts | N | N |
| X | The number of seconds between ping attempts | X(a) Seconds | X(b) Seconds |
| Z | Number of seconds before restarting ping sequence | Z(a) Seconds | Z(b) Seconds |
| H | Number of hours to count down before triggering Fallback Cancellation | H | H |
| T | Number of minutes the SIM needs to wait after the Fallback Cancellation Time expires and triggering the Fallback Cancellation | See Trigger Timer Table | See Trigger Timer Table |

| Total expected time before the fallback process is triggered | [3]-[5] minutes | [6] to [15] minutes |
|---|---|---|

Trigger Timer Table — 2002

| Last digit of the ICCID Number | Time slot over an hour |
|---|---|
| 0 | 0 to 6th minute |
| 1 | 6th to 12th minute |
| 2 | 12th to 18th minute |
| 3 | 18th to 24th minute |
| 4 | 24th to 30th minute |
| 5 | 30th to 36th minute |
| 6 | 36th to 42nd minute |
| 7 | 42nd to 48th minute |
| 8 | 48th to 54th minute |
| 9 | 54th to 60th minute |

| Profile Type | Total Time to complete entire ping sequence | Ping Sequence number | Ping Server | Timing between Pings | Number of failed Pings required per server | Latency limit |
|---|---|---|---|---|---|---|
| Roaming Profile | [6] to [15] minutes | X | [xx.xx.xx.xx] | [60] seconds | [3] pings | [500] Milliseconds |
| | | Y | [yy.yy.yy.yy] | | | |
| | | Z | [zz.zz.zz.zz] | | | |
| Domestic Profile | [3] to [5] minutes | X | [xx.xx.xx.xx] | [20] seconds | [3] pings | [500] Milliseconds |
| | | Y | [yy.yy.yy.yy] | | | |
| | | Z | [zz.zz.zz.zz] | | | |

AUTONOMOUS AND RESILIENT INTEGRATED CIRCUIT DEVICE

CROSS REFERENCE TO RELATED APPLICATIONS

This application is the US national stage of PCT application PCT/GB2021/050371, which claims priority to (1) Application 2015759.0 filed on Oct. 5, 2020 in the United Kingdom and (2) Application 2002663.9 filed on Feb. 25, 2020 in the United Kingdom. The entire contents of these applications are incorporated herein by reference in their entirety.

TECHNICAL FIELD

The present invention relates to an autonomous and resilient universal integrated circuit device (U ICC). In particular, but not exclusively, the present invention relates to a UICC for controlling radio communications via a radio communications network to and from a host device in which the UICC is installed in use.

BACKGROUND

Alarm Signalling Device and Alarm Network

In the event of an emergency, communications from the emergency location or person in need to emergency services, or other entities requiring alert of the emergency, should be fast, responsive and accurate. For example, in police and fire response, blue light emergency response and Telecare personal alarm systems, communication speed and reliability are critical as the emergency may involve a life-threating situation. However, current systems in this field often suffer with connectivity issues and outages and thus unreliable communications channels. This can lead to slow and unresponsive signalling to emergency services. Where a Telecare personal alarm system is being used, unresponsive or slow signalling to emergency health services or nearby carers could present a risk to the health, or even life, of the person in need. In the case of an intruder alarm system, unresponsive or slow signalling to emergency police response could lead to an intruder or attacker getting away after committing a crime.

There are several mainstream signalling methods in remote monitoring of alarm systems for the purpose of signalling between an alarm device and a remote alarm-receiving centre, where the remote alarm-receiving centre can subsequently alert emergency services or other entities requiring alert of the emergency: Redcare, DualCom and Digicom. Redcare uses dual path signalling, meaning it uses both a Global System for Mobile (GSM) radio network path and a telephone line to communicate with the remote alarm-receiving centre. Both signalling paths are constantly polled to verify that the communication link is working and to indicate whether there is any line fault or failure. Emizon also adopts dual path signalling using a GSM radio network path and an on-site broadband connection. DualCom GPRS, from CSL DualCom Limited, is also a dual path signalling device for intruder alarms that uses the GSM radio network, both with and without using General Packet Radio Service (GPRS), and a wired telephone and/or Internet path to transmit intruder, fire and personal attack signals at high speed. If a first radio communications path using a GPRS GSM link is unable to transmit signals, a second radio communications path using a non-GPRS GSM link can be used instead. As another example, if the wired telephone path, e.g. PSTN line, was cut then the intruder alarm signalling device could communicate via either a GPRS GSM link or a non-GPRS GSM link using a mobile network, e.g. Vodafone PakNet, or 2G mobile networks. Digicom, in contrast to the above signalling solutions, uses a single path via a telephone line to communicate with the remote alarm-receiving centre. A fault in the telephone line would result in a lack of communication capability. Dual path connectivity solutions can, therefore, be integrated into security devices to provide resilience against physical attack and from issues arising from connectivity providers such as mobile network operators (MNOs).

An alarm network 100 using dual path signalling to communicate between an alarm device 102 and a remote alarm-receiving centre 104 is shown in FIG. 1 (prior art). The alarm network 100 is described below with reference to DualCom GPRS, which is the subject of European patent application published as EP2124207 entitled 'An alarm network', by way of example.

The purpose of the alarm network 100 is to improve communications between an alarm device 102, such as an intruder alarm unit or a fire alarm unit, and a remote alarm-receiving centre 104. Upon an alarm condition being met, such as the detection of the presence of an intruder, the alarm device 102 issues and transmits an alarm signal to the remote alarm-receiving centre 104 over the alarm network 100. The remote alarm-receiving centre 104 then takes appropriate action, which might include, for example, informing the person responsible for the premises or informing the police.

The alarm device 102 includes a radio module 106, which is arranged to transmit and receive on the GSM radio network, both with and without GPRS, A radio antenna 108 is connected to the radio module 106 and arranged for operation on the frequency of the GSM network and for use with GPRS. The alarm device 102 further includes a SIM card 110. The SIM card 110 stores account and communication details to enable the radio module 106 to operate on the GSM network and in accordance with GPRS. It should be noted that the SIM card used in the particular example of DualCorn GPRS connects to a single MNO, namely Vodafone. The alarm network described as follows, therefore, uses a single MNO network, namely the MNO1 network 112 as shown in FIG. 1. Additional MNO networks, such as the MNO2 network 120 and the MNO3 network 124, and the corresponding servers MNO2 server 122 and MNO3 server 126, are appropriate when the SIM included within the alarm device is connectable to one of a plurality of MNOs. This is described in further detail below with reference to roaming SIMs.

The alarm device 102 also includes an input interface (not shown), a microprocessor (not shown), non-volatile memory (not shown) and a telephone line interface (not shown) to provide communication with a Public Switched Telephone Network (PSTN) telephone line.

The alarm network 100 provides several communications paths, between the alarm device 102 and the remote alarm-receiving centre 104. These can be divided into a first radio communications path using a GPRS GSM link, a second radio communications path using a non-GPRS GSM link, and a wired communications path using a PSTN line.

In order to establish the first radio communications path using the GPRS GSM link, a GPRS GSM radio communications link is initially provided between the alarm device 102 and a GPRS base station (not shown) of an MNO network (MNO1 network in FIG. 1) 112. A secure landline route is provided between the GPRS base station of the NANO network 112 and an MNO server 114 via the Internet 116, and also between the MNO server 114 and a base station (not shown) of a wireless communications network 118. Lastly, the base station communicates with the remote alarm-receiving centre 104 by radio over the wireless communications network 118. By way of a specific example, the secure landline used in DualCom GPRS is provided by one or more leased lines or virtual private network (VPN) tunnels, and the wireless communications network 118 is provided by Paknet by Vodafone, over an X.25 network such as that provided by Kilostrearn.

The second radio communications path using a non-GPRS GSM link can be established between the alarm device 102 and the remote alarm-receiving centre 104 in an analogous manner. In order to establish the second radio communications path using a non-GPRS GSM link, a non-GPRS GSM radio communications link is initially provided between the alarm device 102 and a GSM base station (which may or may not be the same as the GPRS base station used in the first radio communications path); of the MNO network 112. The GSM base station of the MNO network 112 is in communication with a base station of the wireless communications network 118 over the secure landline route, via the MNO server 114 and the Internet 116, Lastly, the base station then communicates with the remote alarm-receiving centre 104 by radio over the wireless communications network 118.

In order to establish the wired communications path between the alarm device 102 and the remote alarm-receiving centre 104, a first wired connection 128 is provided between the alarm device 102 and a telephone exchange 130 using, for example, a PSTN line or Broadband, A second wired connection 132 is provided between the telephone exchange 130 and the alarm-receiving centre 104, again using, for example, a PSTN line or Broadband. The telephone exchange 130 can also be connected to the Internet 116 via a wired connection. In DualCom GPRS, a PSTN line is used for the purpose of establishing the wired communications path between the alarm device 102 and the remote alarm-receiving centre 104.

The DualCom GPRS alarm device includes three modes of operation: 'Standby Mode', 'Alarm Mode', and 'Link Failure Mode'. In Standby Mode, the alarm device 102 periodically sends a polling signal via the first radio communications path to the MNO server 114, also known as a polling server, of the alarm network 100. The polling signal indicates to the MNO server 114 that the alarm device 102 is operating correctly. If no polling signal has been received after a predetermined time limit, the MNO server 114 sends an enquiry signal to the alarm device 102 over the second radio communications path to check whether or not the alarm device 102 is operating correctly. Upon receipt of the enquiry signal, the alarm device 102 attempts to send a reply signal via the second radio communications path to confirm that the enquiry signal has been received and that the alarm device 102 is able to respond accordingly. Upon receiving the reply signal, the MNO server 114 thereby determines that the first radio communications path is not operational, but that the second radio communications path is. In a similar manner, the alarm device 102 is able to detect whether or not the wired communications path is operational. Upon detecting that one of the paths has failed, the alarm device 102 enters Link Failure mode to communicate this failure to the MNO server 114 and the remote alarm-receiving centre 104.

When an alarm condition has been met, e.g. motion has been detected, the alarm device 102 enters Alarm Mode. The alarm device 102 generates and attempts to send an alarm signal to the remote alarm-receiving centre 104 such that appropriate action may then be taken. The alarm device 102 makes three attempts to transmit the alarm signal over the first radio communications path, then two attempts to transmit the alarm signal over the second radio communications path, followed by two attempts to transmit the alarm signal over the wired communications path. This routine ends when an acknowledgement signal is received from the remote alarm-receiving centre 104. The alarm device 102 then exits Alarm Mode. The purpose of the above routine in Alarm Mode is to ensure that transmission of the signal is attempted on an operable path, thereby resulting in successful communication with the remote alarm-receiving centre 104, in the event that one or two of the communications paths become inoperable.

The prior art as described with reference to FIG. 1 and as exemplified by DualCom GPRS provides multiple communications paths to increase chances of an alarm signal being conveyed to the remote alarm-receiving centre 104 which is able to continue to operate satisfactorily even if certain of the paths should become inoperable.

MNO Network Selection

The SIM card used in DualCom GPRS connects to a single MNO, namely Vodafone. In order to further improve resilience in signalling devices, a roaming SIM could be used where a roaming SIM has the ability to connect to and operate on one of a plurality of MNO networks. For example, if the SIM 110 of the alarm device 102 shown in FIG. 1 is a roaming SIM, the roaming SIM is able to connect not only to the MNO1 network 112, but also to a second MNO (MNO2) network 120 and a third MNO (MNO3) network 124. The roaming SIM stores a first, second and third profile associated with the MNO1 network 112, the MNO2 network 120 and the MNO3 network 124, respectively. The MNO network which has the most stable connection can be selected for the radio communications path.

In typical mobile device use such as web browsing on a mobile phone, an 'automatic roaming' algorithm is used to select and switch between MNO networks. Automatic roaming typically involves a user having an agreement with a home MNO, where the home NANO itself maintains a list of roaming MNOs which have a roaming agreement with the home MNO. The list of roaming MNOs is then prioritised to provide a preferred list of roaming MNOs, such that if the connection with the home MNO fails then connection is attempted with one of the roaming MNOs in the order of the prioritised list. However, signal integrity is crucial in alarm signalling devices and the roaming MNO selected by automatic roaming may not provide the best signal integrity for a given area.

Alternative roaming algorithms have been developed for use in alarm devices, which select a roaming MNO that provides improved signal integrity. By way of example, UK patent application published as GB2533853 entitled 'Selecting a cellular network for communication of an alarm signal based on reliably of the available cellular networks' uses a roaming SIM, e.g. Vodafone GDSP, as part of the alarm device to select an MNO network. Key features of the alarm device 202 including the roaming SIM are shown in FIG. 2 (prior art) and briefly described below.

The alarm device 202 includes a radio module 206 and associated roaming SIM 210. The alarm device 202 further includes a radio antenna 208 connected to the radio module 206 for transmitting and receiving GPRS data. The alarm device 202 also includes a microcontroller 203 having memory 205 that includes flash memory and non-volatile memory. The microcontroller 203 is connected to the radio module 206. The microcontroller 203 processes data for transmission and data received by the radio module 206 via the radio antenna 208. The microcontroller 203 controls the radio module 206 in relation to such transmission and receipt of data. The microcontroller 203 also controls the radio link with an MNO network through the roaming SIM 210 associated with the radio module 206. Hence, the microcontroller 203 controls and determines which MNO network the alarm device 202 is connected to. An algorithm called the Connection Manager 207 is held in memory 205, which when run on the microcontroller 203 enables the transmission and receipt of data between the alarm device 202 and the Internet via the MNO network.

The alarm device 202 also includes the following features in connection with the microcontroller 203 which, for the purpose of simplicity, are not shown in FIG. 2: a user interface, sensors, a power management circuit, an external input/output, a PSTN interface, and a LAN interface.

The roaming SIM 210 is connectable to one of a plurality of MNO networks, such as the MNO1 network 212, the MNO2 network 220 and the MNO3 network 224. The radio module 206 uses survey functionality to provide information on the available MNO networks 212, 220, 224 in the location of the alarm device 202. The alarm device 202 then measures the reliability of communication over each of the available MNO networks 212, 220, 224 based on signal strength. For each available MNO network at the location, the alarm device 202 instructs the radio module 206 and roaming SIM 210 to connect to each of the available MNO networks 212, 220, 224 in turn. The alarm device 202 then instructs the radio module 206 to transmit, via the radio antenna 208, a signal packet to a primary polling server (not shown) via the connected MNO network. In response, the primary polling server transmits a signal packet (not shown) back to the alarm device 202. The microcontroller 203 of the alarm device 202 analyses the signal packet and saves data in memory 205 corresponding to the cell signal quality, signal-to-noise ratio, number of cells within effective range of the alarm device 202, and bit error rate. The Connection Manager 207 then decides, based on the data collected for each of the MNO networks 212, 220, 224, when a change in MNO network should be made and to which MNO network the connection should be made. The Connection Manager 207 selects the MNO network with the highest measure of reliability. Through the Connection Manager 207, the microcontroller 203, the radio module 206 and the roaming SIM 210 are instructed to register with and connect to the selected MNO network.

Some roaming SIMs are capable of not only roaming between MNO networks in the home country of the SIM but also between MNO networks in other countries. Such international roaming SIMs are used in alarm devices to provide access to additional MNO networks. As an example, Dual-Com Pro, from CSL DualCom Limited, uses an international roaming SIM, namely a multi-network 4G WorldSIM International SIM. An international roaming SIM associated with a home network in its home country can be used in any other country that has a roaming agreement with the home network. For example, if a particular roaming SIM is associated with a home MNO that operates in a home country outside of the UK, when switched on in the UK, the roaming SIM could then roam between all of the available MNOs in the UK that have a roaming agreement with the home MNO, rather than being fixed to a single NANO in the UK. If one MNO had an outage, as determined by the network, then the SIM could be instructed to simply roam and connect to the next available MNO. This provides access to all mobile networks and uses a roaming algorithm to select the network with the strongest signal, thereby eliminating downtime.

Dual SIM Alarm Devices

Since 2018, a rise in MNO outages has been observed as 4G networks have become capable of frequent network upgrades. In order to address this concern, alarm devices with a plurality of SIM slots and a plurality of associated radio modules, also known dual SIM and dual radio alarm devices, were launched in 2019. Such devices include two or more SIM slots to enable two or more SIM cards operating over two independent radio modules to be used within the same alarm device. In the event that an MNO outage is detected by the device, whilst using a primary SIM located in a primary SIM slot, the device can switch from the primary SIM slot to the secondary SIM slot. A secondary SIM located in the secondary SIM slot would then connect to its respective MNO. For example, GradeShift Pro Radio/Radio, by CSL DualCom Limited, uses two 4G WorldSIMs, one as the primary path and the other as the secondary path. Each SIM operates on an independent network from the other and uses its own radio module.

eUICC SIM: Fallback and Fallback Cancellation

Currently, the standard SIM card is a Universal Integrated Circuit Card (UICC) SIM and its applications and data play a fundamental role in ensuring the connectivity and security of the alarm device and network. The GSM Association (GSMA) based on the existing UICC technology defined a set of embedded UICC (eUICC) (alternatively known as eSIM) specifications that allows "Over-the-Air" (OTA) provisioning of MNO profiles (subscriptions) onto an eUICC SIM. This enables the operator of the SIM card to change the active MNO profile to allow the SIM to connect to an alternative MNO network.

When designing the OTA capabilities of the eUICC, the main challenge that the GSMA addressed was to be able to change the profile of the SIM without having to physically visit the device. For example, if a new MNO profile was sent to the SIM, but for some reason the new MNO profile did not work, it would be undesirable to then lose contact with the SIM. OTA capabilities meant that it was not necessary to physically visit the device in order to change the SIM, which is expensive to do. If an error occurred in the switch to a new profile, it would render the device useless until it was physically visited to be fixed, as it would have lost connectivity.

The GSMA has defined two separate implementations of eUICC. The first implementation is directed to selection of the MNO network by the consumer (also known as the 'consumer solution'). For the 'direct-to-consumer' channel, which targets consumers and enterprises, this solution is required where the end user (or consumer) has direct choice of the MNO supplying network connectivity. Alternative MNO profiles are pulled to the eUICC and the consumer device. As consumer devices have keyboards and screens, the device can then present options enabling the consumer to actively choose an MNO to provide network connectivity. This is known as a 'Pull (to the device) solution'. As an example, the Apple SIM may be configured with different MNO profiles and to present the different MNO profiles to the user via the user interface of the mobile device. This allows the user to actively choose and select the MNO profile and thereby connect to the MNO network of choice.

The second implementation is directed to business-to-business customers (also known as the M2M solution). For the 'business-to-business' channels, this solution serves the needs of business-to-business customers specifically in the Internet of Things (IoT) market. As devices may not have screens and keyboards and the device may be in a remote location, operators need the ability to push new MNO profiles and settings to the eUICC. The standards for this are different to the above-described consumer solution. This is known as a 'Push (to the device) solution'.

In both of the above implementations of eUICC, there are processes in place to control the switching between profiles of different MNOs (e.g. MNO Y and MNO X) such that the eUICC can be reconnected in the event of an MNO network outage or failure. Such processes are now exemplified with reference to the alarm device 302 shown in FIG. 3 (prior art). The alarm device 302 includes a radio module 306 and associated eUICC 310. The alarm device 302 further includes a radio antenna 308 and a microcontroller 303 having memory 305 which holds a program 307, which are analogous to the corresponding features of the alarm device 202 shown in FIG. 2. The program 307 when run on the microcontroller 303 enables the transmission and receipt of data between the alarm device 302 and the Internet via either the MNO Y network 312 or the MNO X network 320. As with the alarm device 202 of FIG. 2, the microcontroller 303 of the alarm device 302 of FIG. 3 controls the radio module 306 in relation to such transmission and receipt of data as well as the radio link with an MNO network through the eUICC 310.

The eUICC 310 includes, in its memory (not shown), two profiles (schematically shown in FIG. 3) whereby each profile is associated with a different MNO. Namely, a first profile 311, which is often called the 'Operational Profile', is associated with MNO Y. A second profile 313, which is called the 'Fallback Profile' or 'Bootstrap Profile', is associated with MNO X. The terms 'Fallback Profile' and 'Bootstrap Profile' can be used interchangeably. For simplicity, the first profile 311 will be referred to as the Operational Profile 311 and the second profile 313 will be referred to as the Bootstrap Profile 313 going forward.

In this example, the Operational Profile 311 is currently active which means that the eUICC 310 is connected to the MNO Y network 312. In the event that the MNO Y network 312 or alarm device 302 identifies a loss of service, the eUICC 310 is notified of the event. For example, if the MNO Y network 312 rejects a connection attempt because of an issue with the MNO Y network 312, such as network congestion, PLMN specific network failures, or authentication failures, this network rejection event is provided to the eUICC 310 to communicate to the microcontroller 303 that there is no service available using the MNO Y network 312 due to a network rejection event. Alternatively, the microcontroller 303 together with the radio module 306 of the alarm device 302 can identify a loss of service with the MNO Y network 312 and then communicate a loss of service event to the eUICC 310.

The eUICC 310 receives either the network rejection event generated by the network or the loss of service event generated by the device, and once received, this triggers a process called a Fallback process. The Fallback process requires the eUICC 310 to switch from the Operational Profile, which is associated with MNO Y, to the Bootstrap Profile, which is associated with a different MNO, in this example MNO X. As a consequence, the eUICC 210 connects to the MNO X network 320, thereby enabling the alarm device 302 to reconnect and come back online. Importantly, the Fallback process is initiated by receiving a command from either the network 312 or the alarm device 302 itself.

In the event of an outage in the MNO X network 320 whilst using the Bootstrap Profile 313, a process called a Fallback Cancellation process can be used. Fallback Cancellation allows the eUICC 310 to cancel the Fallback mechanism, thereby switching the eUICC 310 from the Bootstrap Profile 313 back to the Operational Profile 311. This was implemented initially for the car industry where the car may need to make an emergency call in the event of an accident. If there was an outage on the Bootstrap Profile, then the car would be unable to make a call, hence the Fallback Cancellation process was designed to switch from the Bootstrap Profile to the Operational Profile. As with the Fallback process, in order to initiate the Fallback Cancellation process, the alarm device 302 or network 320 is required to command the eUICC 310 to perform Fallback Cancellation to switch back to the Operational Profile.

In summary, current prior art implementations of the eUICC enable the Fallback and Fallback Cancellation processes to be carried out only by way of the device or network identifying connectivity issues or loss of service and subsequently instructing the eUICC to switch between the Operational Profile and the Bootstrap Profile. Without the commands or instructions from the device or network, the current implementations using the eUICC are incapable of performing the Fallback and Fallback Cancellation processes.

This presents significant problems for the connectivity of the eUICC 310. Firstly, in existing solutions an MNO network outage or failure can be detected by the device or network only. The eUICC 310 is not capable of detecting or identifying an outage independently. This can result in a time lag between the time at which the outage occurs, the time at which the outage is detected and the time at which the eUICC is provided with instructions to switch profiles and connect to a different MNO. In addition, if the device or network does not detect an outage, then the eUICC will lose connectivity and become stranded until the outage issues are resolved. The device may have also poorly implemented the standards, which again would result in the eUICC or device becoming stranded.

Secondly, once the eUICC 310 has switched from the Operational Profile 311 associated with MNO Y to the Bootstrap Profile 313 associated with MNO X, the MNO X network 320 may then experience an outage or failure. In this situation, the Fallback Cancellation process would normally need to be carried out manually from a remote platform. In rare circumstances, the Fallback Cancellation process may be carried out by instruction from the device. In any case, if the MNO X network 320 experiences an outage and the Fallback Cancellation process has not been implemented, the eUICC 310 would lose connectivity as a result.

The eUICC 310 in existing systems is effectively a slave to the device and network, and it must be instructed to perform certain actions such as to carry out the Fallback and Fallback Cancellation processes.

For example, if the eUICC 310 is on the Operational Profile 311 and an outage is detected on the MNO Y network 312 by the network 312 or the device 302, upon receiving an instruction from the network 312 or the device 302 the eUICC 310 switches from the Operational Profile 311 to the Bootstrap Profile 313 such that it can connect to the MNO X network 320. Whilst on the Bootstrap Profile 313, the issues which caused the outage on the MNO Y network 312 are resolved which results in the MNO Y network 312 being functional again. If the MNO X network 320 experiences an outage, the eUICC 310 will become disconnected, despite the MNO Y network 312 being functional, because the eUICC 310 is still on the Bootstrap Profile 313. Initiation of the Fallback Cancellation process from the remote platform to switch back to the Operational Profile 311 would not be possible because the eUICC 310 is disconnected and no longer reachable. The eUICC 310 would remain disconnected until the outage in the MNO X network 320 is resolved and the eUICC 310 is manually reconnected to the MNO Y network 312.

It should now be clear that current implementations of the eUICC are still susceptible to failure in certain circumstances and are therefore not capable of responding to an outage autonomously or resiliently, Although mobile networks are an ideal transmission path for communications to emergency services, outages in MNO networks, e.g. due to frequent network upgrades or network failures, combined with a lack of resilience can be severely disruptive to communications and signalling in emergency response systems.

The present invention aims to overcome or at least partly mitigate one or more of the above described problems.

SUMMARY OF THE INVENTION

The present invention relates to an improved resilient and autonomous SIM card which provides an improved method of dealing with outages in MNOs, e.g. due to frequent network upgrades or network failures. As a result of the improved resilient and autonomous SIM card, disruption to communications using mobile networks as the transmission path is drastically reduced. This in turn has positive consequences on signalling in emergency response systems, leading to faster and more responsive alerts to emergency services.

The improved resilient and autonomous SIM card comprises an Applet, which is installed on the SIM. The Applet is configured to detect a loss of connectivity in MNO networks and manage profiles associated with different MNOs to ensure that connectivity is maintained whenever the active MNO providing the service of connectivity experiences an outage. The SIM of the present invention is thereby rendered 'outage-proof'.

It is important to note that in embodiments of the present invention, the operational logic for identifying a possible outage in an NANO network exists in the Applet, which is running on the SIM. This is in contrast to prior art systems in which only the device or network would be capable of identifying a possible outage. In addition, the operational logic for initiation of the Fallback and Fallback Cancellation processes exists in the Applet. In contrast, prior art systems require the device or the network to command the SIM to carry out these processes.

The SIM utilises two or more independent MNOs and operates autonomously such that no human, platform or device interaction is required in order to maintain uptime and continuity of service. In addition, the SIM provides this functionality without any need to make any changes to the device it is deployed with.

In addition, a key advantage of the eUICC SIM of the present invention is that it is retrofittable to any device that is compatible with an eUICC SIM card. For example, legacy devices that were designed and built before the GSMA standards were implemented or ratified are unable to imitate the Fallback and Fallback Cancellation processes using a standard SIM. To address this problem, the Applet of the SIM of the present invention provides the required standards on the SIM and enables the instructions for Fallback and Fallback Cancellation processes to be triggered from within the SIM. The SIM can then be used on any device that is compatible with an eUICC SIM, including legacy devices which would previously have been unable to imitate such processes.

According to a first aspect of the present invention, there is provided a universal integrated circuit card (UICC) for controlling radio communications via a radio communications network to and from a host device in which the UICC is installed in use, the UICC comprising: a microprocessor for controlling the operation of the UICC; a data store for storing data relating to the operation of the UICC, the data store comprising: a plurality of mobile operator network profiles including: an operational profile comprising radio communications network settings for connecting the host device to a first radio communications network; and a bootstrap profile comprising radio communications network settings for connecting the host device to a second radio communications network; and a program comprising a plurality of instructions for configuring operation of the UICC: wherein, in use, the microprocessor is configured by the program to: use the operational profile to connect the host device to the first radio communications network; detect a loss of operational connectivity with the first radio communications network; and use the bootstrap profile to connect the host device to the second radio communications network to re-establish radio communications to and from the host device.

The UICC may be an embedded UICC (eUICC) which enables the program and profiles to be configured and/or updated remotely.

The program may comprise an applet having a relatively small size and dedicated functionality.

The data store may be provided in a secure transversal domain of the UICC and the operational profile or the bootstrap profile is able to securely provide access the secure transversal domain of the UICC to allow an external server to make changes to the program stored therein.

The UICC may further comprise a set of variable parameters, stored as files in the data store for configuring the operational and bootstrap profiles and their use in controlling radio communications via the radio communications network to and from the host device. The parameters may be stored in separate configuration files, such that the configuration file can be replaced via an update process. An example of a parameter stored in a configuration file is a ping server address.

The program may comprise instructions for configuring the microprocessor in use to: perform a first radio communications network connectivity test to test the radio communications network connectivity between the host device and the first radio communications network and return a first connectivity test result based on the radio communications network connectivity test; determine, based on the first connectivity test result, if a loss of radio communications network connectivity has occurred between the host device and the first radio communications network; and if such a loss of connection has been determined, deselect the operational profile and select the bootstrap profile and use the bootstrap profile to connect to the second radio communications network based on the network settings of the bootstrap profile in order to re-establish radio communications network connectivity to the host device.

The program may comprise instructions for configuring the microprocessor in use to: start a cancellation timer, for a predetermined time period when a loss of connection on the first network has been detected; deselect the bootstrap profile and re-select the operational profile once the cancellation timer is completed, and use the operational profile to re-connect to the first radio communications network in order to re-establish radio communications network connectivity between the host device and the first radio communications network.

The program may comprise instructions for configuring the microprocessor in use to: perform, following use of the bootstrap profile to connect the host device to the second radio communications network, a second radio communications network connectivity test to test the radio communications network connectivity between the host device and the second radio communications network: and return a second connectivity test result based on the radio communications network connectivity test; determine, based on the second connectivity test result, if a loss of radio communications network connectivity has occurred between the host device and the second radio communications network;

and if such a loss of connection has been determined, to deselect the bootstrap profile and re-select the operational profile and use the operational profile to connect to the first radio communications network based on the network settings of the operational profile in order to re-establish radio communications network connectivity to the host device.

In embodiments, the program comprises instructions for configuring the microprocessor in use to: determine a time slot for using the re-selected operational profile; and delay the disconnection from the second radio communications network and use of the re-selected operational profile to connect to the first radio communications network until the time slot is reached.

Preferably, the time slot is determined using a random number or a digit taken from an ICCID, IMEI, or MISDIN associated with the UICC or host device. However, the time slot may be determined by other means.

In embodiments, the program comprises instructions for configuring the microprocessor, in use, to perform the first or the second radio communications network connectivity test by testing the radio communications network connectivity between the host device and one or more test servers within the radio communications network being tested.

Preferably, the program comprises instructions for configuring the microprocessor in use to perform the first or second radio communications network connectivity test by performing a ping test, wherein the ping test comprises: sending, to a test server of the one or more test servers, a forward data packet; determining whether a response data packet is received from the test server; and returning a negative first or second radio communications network connectivity test result if the response data packet is not received from the test server within a predetermined time period from sending the forward data packet.

The program may comprise instructions for configuring the microprocessor in use to perform the first or second radio communications network connectivity test by performing a ping sequence test, wherein the ping sequence test comprises: sending, to a first test server of the one or more test servers, a first forward data packet; determining whether a first response data packet is received from the first test server within a first predetermined time period; sending, to a second test server of the one or more test servers, a second forward data packet, if it is determined that the first response data packet is not received within the first predetermined time period; determining whether a second response data packet is received from the second test server within a second predetermined time period; sending, to a third test server of the one or more test servers, a third forward data packet, if it is determined that that the second response data packet is not received within the second predetermined time period; determining whether the third response data packet is received from the third test server within a third predetermined time period; returning a negative ping sequence test result if it is determined that the third response data packet is not received within the third predetermined time period; returning a negative first or second radio communications network connectivity test result if the negative sequence ping result is returned.

The program may comprise instructions for configuring the microprocessor in use to perform the first or second radio communications network connectivity test by repeating the ping sequence test one or more times; and wherein the negative radio communications network connectivity test result is returned only if the number of consecutive negative ping sequence test results exceeds a predetermined threshold.

In embodiments, the program comprises instructions for configuring the microprocessor in use to perform the first or second radio communications network connectivity test by performing a data test, wherein the data test comprises: sending, to a test sever, a predetermined amount of data; determining whether the predetermined amount of data has been delivered to the test server; and returning a negative first or second radio communications network connectivity test result in the event that the predetermined amount of data has not been delivered to the test server.

The program may comprise instructions for configuring the microprocessor in use to perform the first or second radio communications network connectivity test by performing a network layer test, wherein the network layer test comprises: testing different network layers of the first or second radio communications network.

In embodiments, the data store comprises a roaming profile comprising radio communications network settings for connecting the host device to a roaming radio communications network; and the program comprises instructions for configuring the microprocessor in use, after detecting the loss of operational connectivity with the first communications network, to use the roaming profile to connect the host device to the roaming radio communications network based on the network settings of the roaming profile in order to re-establish radio communications to and from the host device.

The data store may comprise a plurality of radio network profiles, each comprising radio communications network settings for connecting the host device to a respective radio communications network; and the UICC may be configured to enable remote selection of the operational profile and the bootstrap profile from the plurality of profiles.

The data store may comprise a plurality of radio network profiles, each comprising radio communications network settings for connecting the host device to a respective radio communications network; and the UICC may be configured to enable local user selection of the operational profile and the bootstrap profile from the plurality of profiles.

Preferably, each radio network profile in the plurality of radio network profiles is associated with a different independent radio communications network.

In embodiments, each network profile in the plurality of network profiles is associated with an independent radio communications network platform or a different instance of the same radio communications network platform.

The UICC may comprise an eUICC, a Mini SIM, a Micro SIM, a Nano SIM or a Solderable SIM.

According to a second aspect of the present invention, there is provided a host device comprising a processor having a memory, a radio module for connecting the host device to a radio communications network, and the universal integrated circuit device described above with reference to the first aspect of the present invention.

The host device may comprise an alarm device, a smart phone, a tablet computer, a dangle, a router, a GPS tracking device, an M2M device, an IoT device, a vehicle, a telehealth device or a telecare device.

According to a third aspect of the present invention, there is provided a method of operating a universal integrated circuit card (UICC) for controlling radio communications via a radio communications network to and from a host device in which the UICC is installed in use, the method comprising: providing access to data relating to the operation of the UICC stored in a data store of the UICC, the data including a plurality of mobile operator network profiles including: an operational profile comprising radio communications network settings for connecting the host device to a first radio communications network; and a bootstrap profile comprising radio communications network settings for connecting the host device to a second radio communications network; and controlling the operation of the UICC using a microprocessor of the UICC and a program comprising a plurality of instructions for configuring operation of the UICC; the controlling step comprising: connecting the host device to the first radio communications network using the operational profile, detecting a loss of operational connectivity with the first radio communications network; and connecting the host device to the second radio communications network using the bootstrap profile, to re-establish radio communications to and from the host device.

According to a fourth aspect of the present invention, there is provided a computer program product or a computer-readable storage medium comprising instructions which, when executed by a computer, cause the computer to perform the method described above with reference to the third aspect of the present invention.

According to a fifth aspect of the present invention, there is provided a computer-implemented method of re-establishing a radio communications network connection between a host device and a network platform providing the radio communications network connection, wherein the host device includes a universal integrated circuit card (UICC) having a mobile operator network profile for controlling the radio communications network connection, the method comprising: receiving, from the UICC via the radio communications network connection, a first data packet; receiving, from the UICC via the radio communications network connection, a second data packet; determining first time data indicative of the amount of time elapsed between receipt of the first data packet and receipt of the second data packet; comparing the first time data to a predetermined time threshold; transmitting a reset request from the radio communications network platform to reset the radio communications network connection to the host device, if the first time data is greater than the predetermined time threshold.

The computer-implemented method may further comprise: initiating a reset timer after the comparing step, if the first time data is greater than the predetermined time threshold; and comparing a value of the reset timer to a predetermined reset timer threshold; wherein the transmitting step is delayed until the value of the reset timer is greater than predetermined reset timer threshold.

The predetermined reset timer threshold may be configurable to different time periods.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The present invention will now be described, by way of example only, with reference to the accompanying drawings, in which:

FIG. 10 is a flow diagram showing the process by which the Fallback Cancellation process of FIG. 7 is carried out in greater detail, in accordance with the first embodiment;

FIG. 19 is a table showing the timings used in the ping connectivity tests and Fallback and Fallback Cancellation processes for domestic and roaming profiles in the embodiments of the present invention;

FIG. 20 is a table showing the determination of possible time slots using a random digit of the ICCID number, used in an embodiment of the present invention;

FIG. 21 is a table showing configurable elements of the Applet of the eUICC of FIG. 5;

DETAILED DESCRIPTION OF EXEMPLARY EMBODIMENTS

Embodiments of the present invention relate to an improved resilient and autonomous SIM card which provides an improved method of dealing with outages or connectivity issues in MNO networks, e.g. due to frequent network upgrades or network failures. As a result of the improved resilient and autonomous SIM card, disruption to communications using mobile networks as the transmission path is drastically reduced. This in turn has positive consequences on signalling in emergency response systems, leading to faster and more responsive alerts to emergency services.

An eUICC according to a first embodiment of the present invention will now be described will reference to FIGS. 4 to 6, followed by the processes involved with reference to FIGS. 7 to 10.

Figure 1:
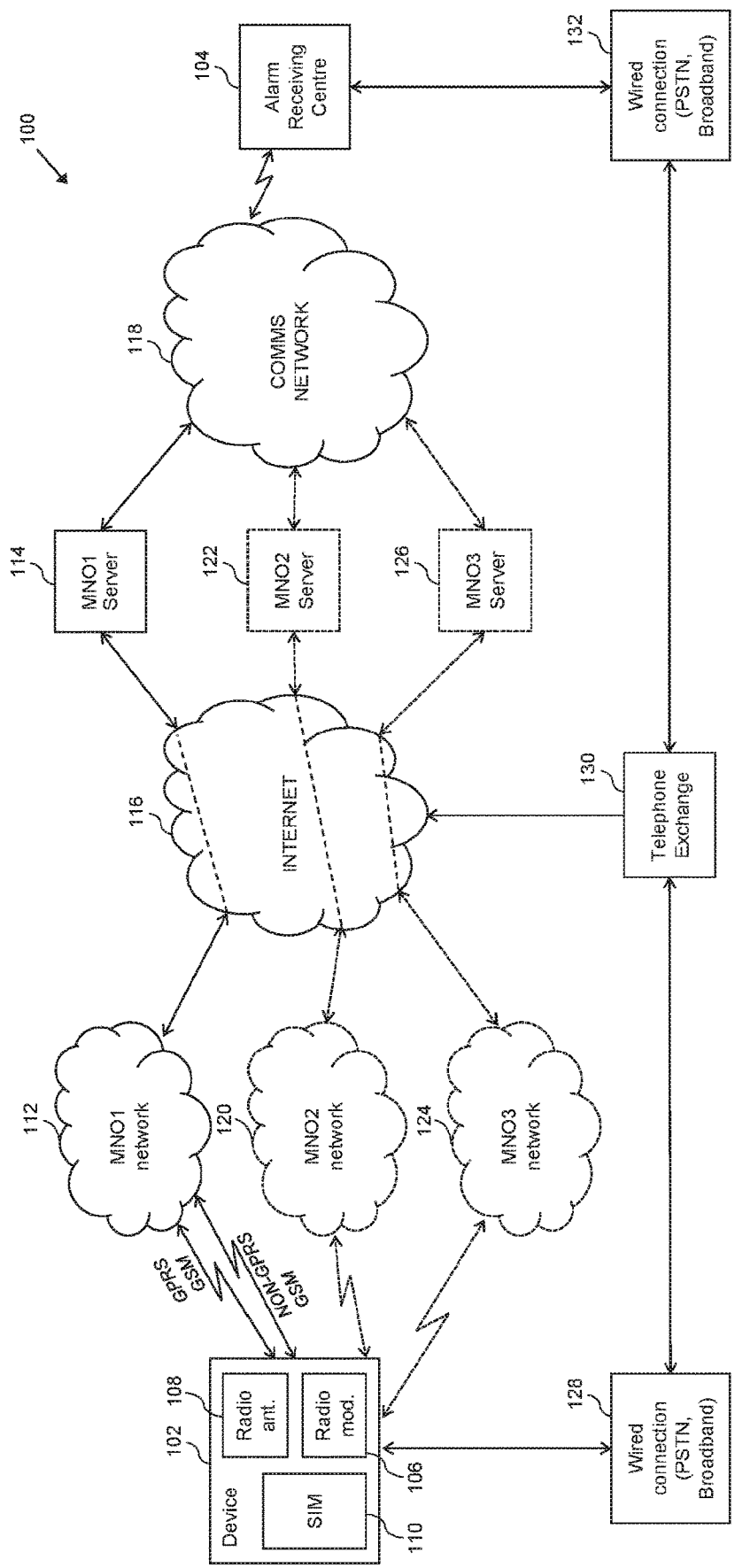
FIG. 1 is a schematic diagram showing a known alarm network using dual path signalling to communicate between an alarm device and a remote alarm-receiving centre.
Figure 2:
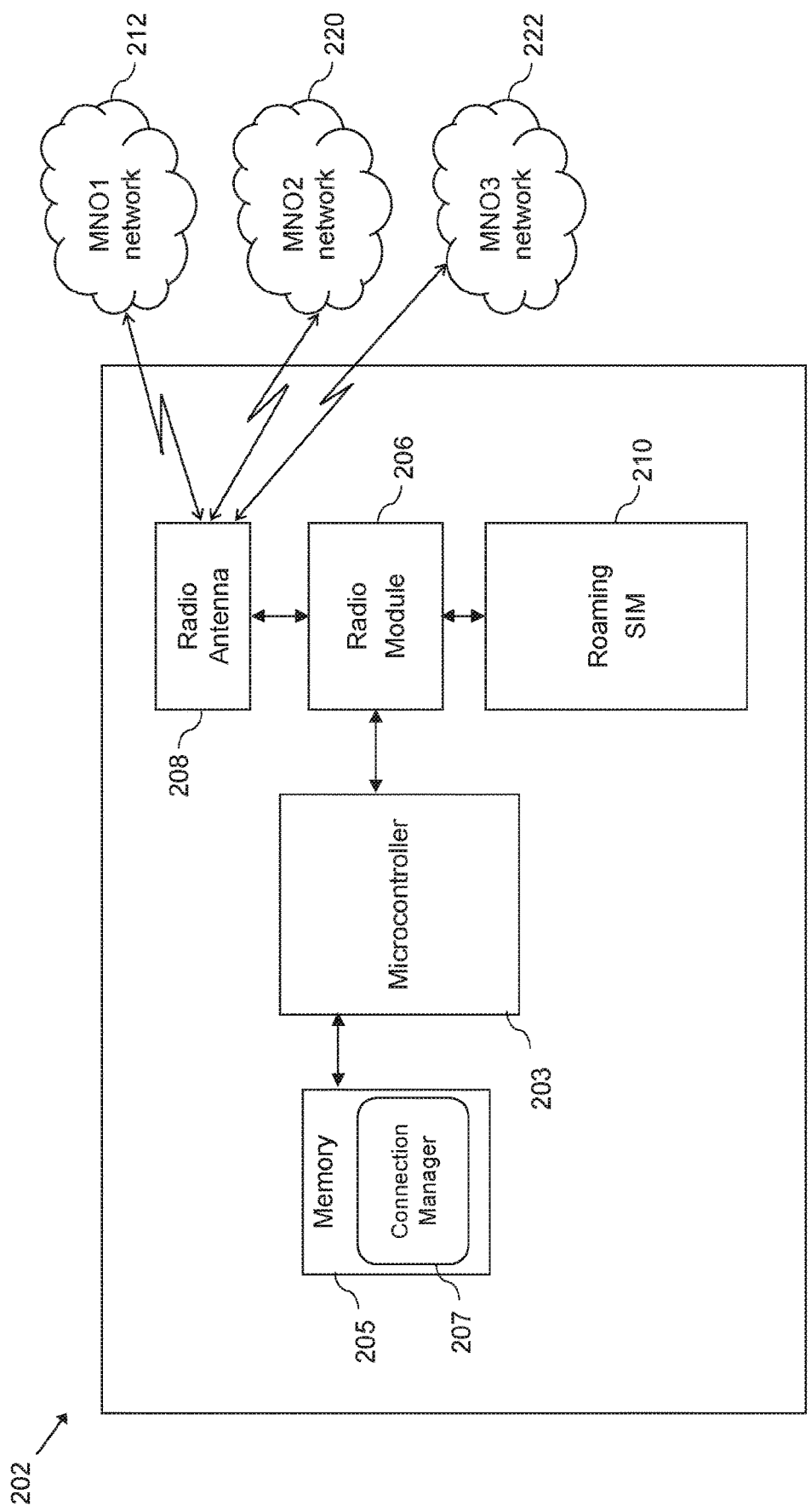
FIG. 2 is a schematic diagram showing a prior art alarm device comprising a roaming SIM.
Figure 3:
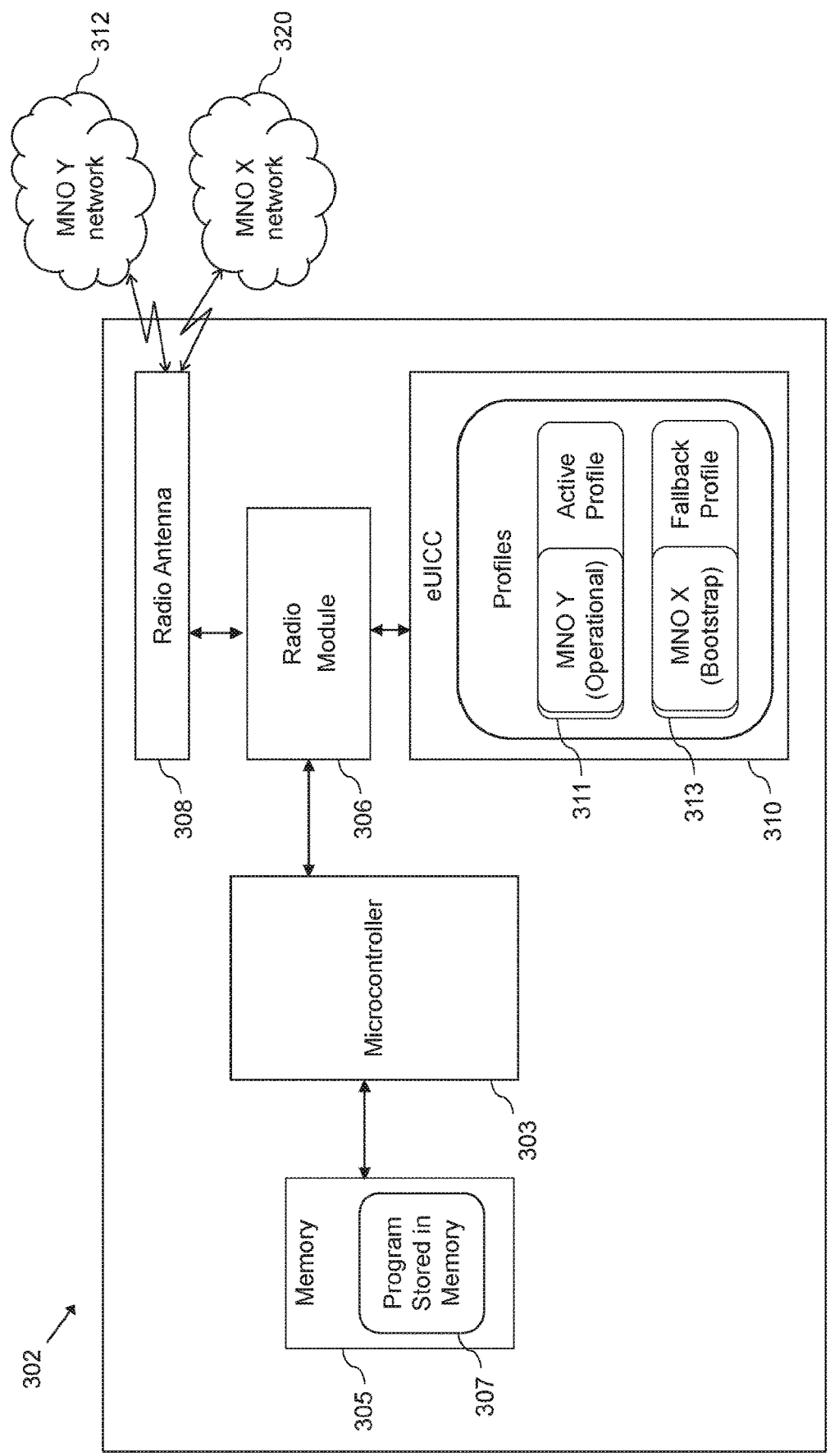
FIG. 3 is a schematic diagram showing another prior art alarm device comprising an eUICC.
Figure 4:
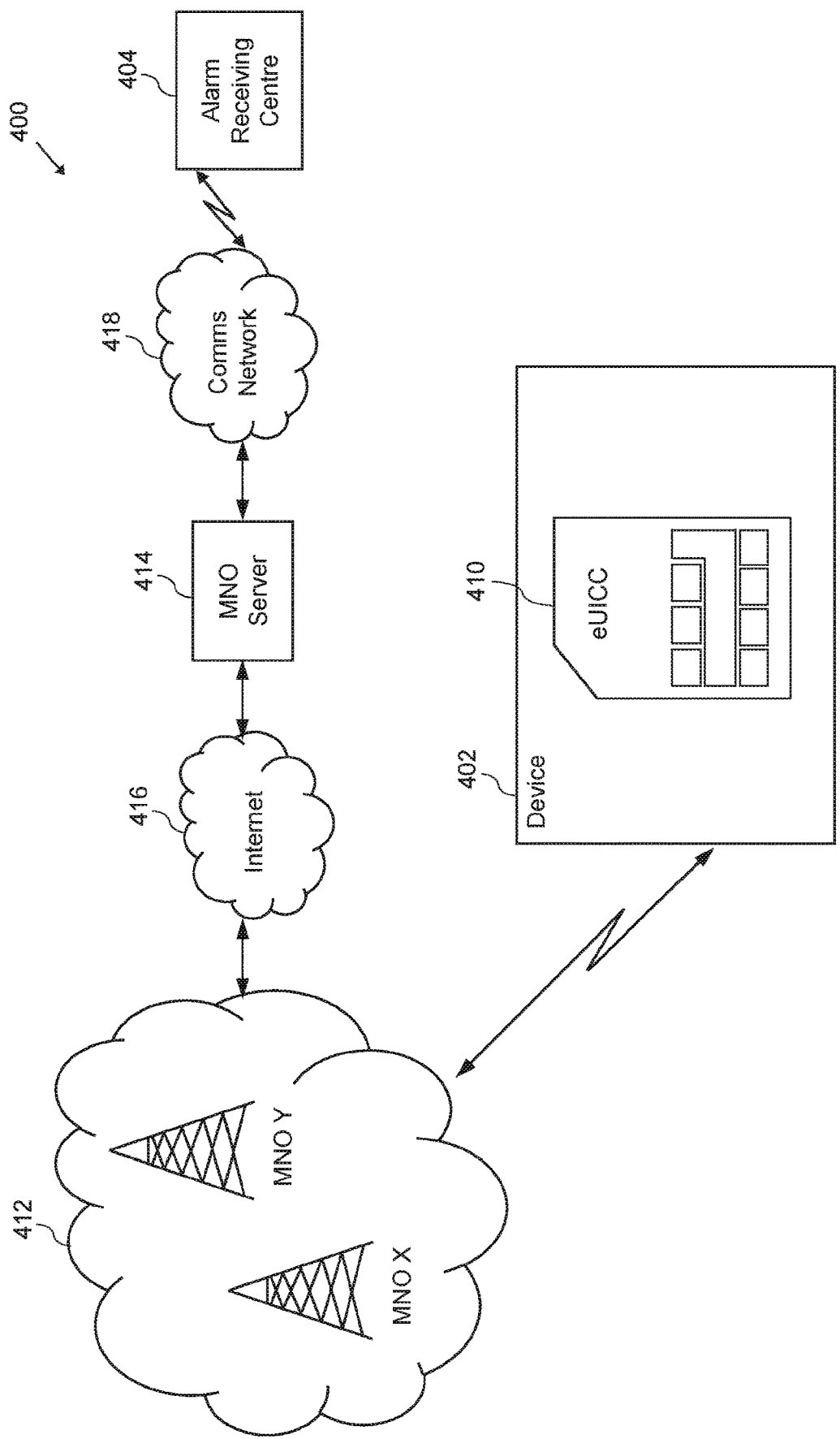
FIG. 4 is a schematic diagram showing an eUICC within an alarm device, and an alarm network to communicate between the alarm device and a remote alarm-receiving centre, in accordance with a first embodiment of the present invention.

FIG. 4 shows an alarm network 400 providing a communications channel between an alarm device 402 and a remote alarm-receiving centre 404. The alarm device 402 issues and transmits an alarm signal to the alarm-receiving centre 404 over the alarm network 400. The alarm-receiving centre 404 then takes appropriate action, which might include, for example, informing the person responsible for the premises or informing the police.

The alarm device 402 comprises an eUICC 410 which stores account and communication details to enable a radio module (not shown) within the alarm device 402 to operate on the mobile telecommunications network. The alarm device 402 is thereby connectable to one or more MNO networks 412. As an example, MNO X and MNO Y are shown in FIG. 4 as providers of the available MNO networks 412.

A radio communications path is provided by the alarm network 400 between the alarm device 402 and the alarm-receiving centre 404. A radio communications link is initially provided between the alarm device 402 and an MNO network 412. The radio communications link may be provided by Long Term Evolution (LTE), which is a 4G communication standard, GSM using 3G or 2G networks, Code Division Multiple Access (CDMA) using 3G or 2G, or a 5G network, A secure landline route is provided between the MNO network 412 and an MNO server 414 via the Internet 416, and also between the MNO server 414 and a wireless communications network 418. Lastly, the wireless communications network 418 has a radio communications link with the alarm-receiving centre 404, In the present embodiment, the secure landline is provided by one or more leased lines or virtual private network (VPN) tunnels, and the wireless communications network 418 is provided by, for example, BT or Virgin Media. In some embodiments, several communications paths, including radio communications paths and wired communications paths, may be provided between the alarm device 402 and the alarm-receiving centre 404 by the alarm network 400.

Figure 5:
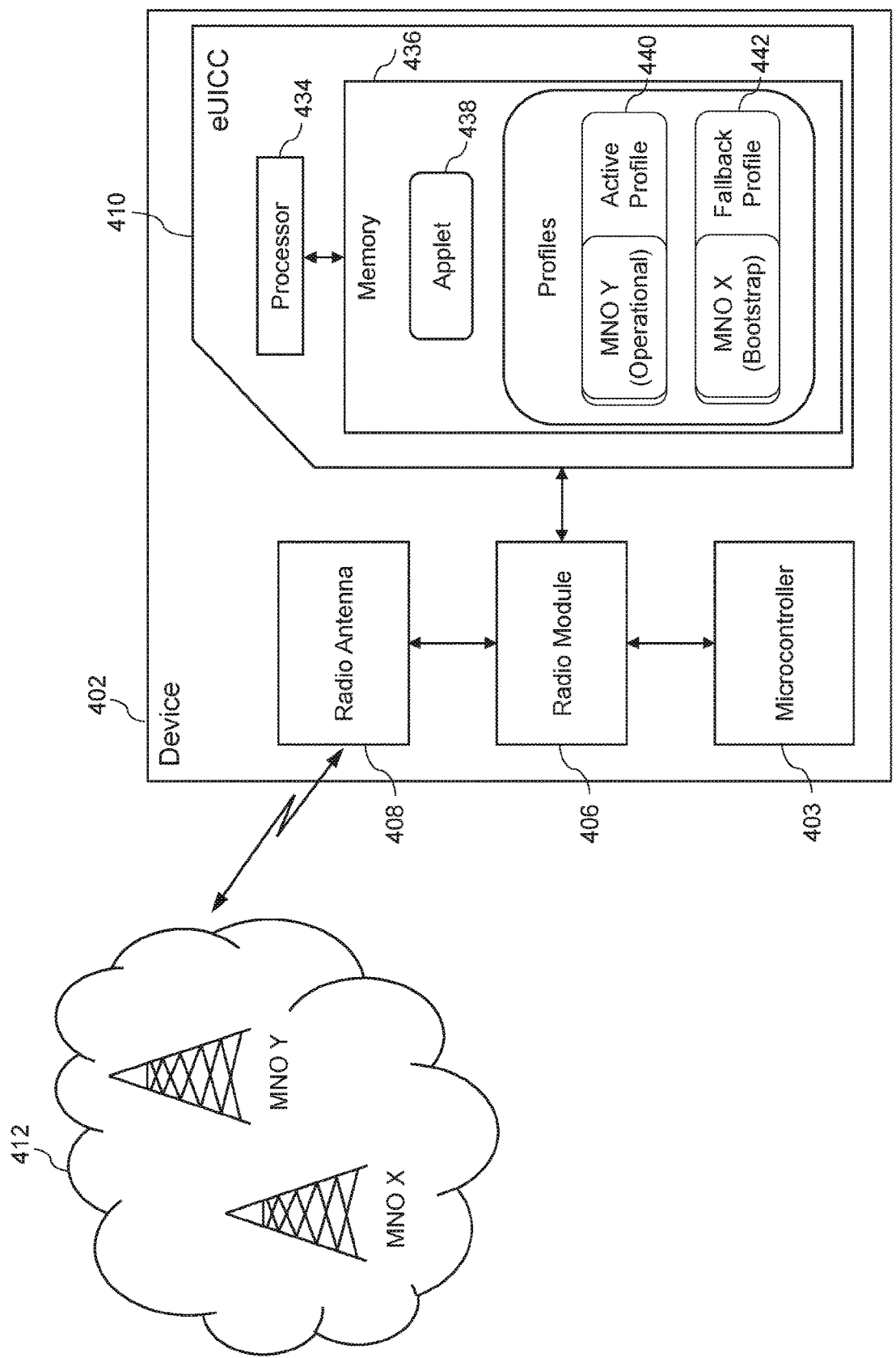
FIG. 5 is a schematic diagram showing components of the eUICC and alarm device shown in FIG. 4 in greater detail.

Components of the alarm device 402 and the eUICC 410 are shown in greater detail in FIG. 5. The alarm device 402 comprises a radio module 406, which is arranged to transmit and receive on the radio network (e.g. 5G/4G/3G/2G). A radio antenna 408 is connected to the radio module 406 and arranged for operation on the frequency of the radio network. The alarm device 402 further comprises a microcontroller 403, connected to the radio module 406, which has a memory (not shown) that includes flash memory and non-volatile memory. The microcontroller 403 processes data for transmission and data received by the radio module 406 via the radio antenna 408. The microcontroller 403 controls the radio module 406 in relation to such transmission and receipt of data. The alarm device 402 in some other embodiments can also include an input interface (not shown).

The eUICC 410 comprises a processor 434 having secure memory 436. A set of profiles is held in secure memory 436, where each profile is associated with a different MNO network. In order for the eUICC to be resilient, each profile is associated with MNOs that operate independent networks, There are many points within an MNO network where connectivity issues could arise. Using MNO networks that are independently set up provides an advantage in that the likelihood of experiencing connectivity issues on both of the MNO networks at the same time is low, and this enables the eUICC to be more resilient. For example, the independent MNO networks may use different masts and radio antennas. In order to further improve resilience, each profile may be associated with an MNO that operates a core network that is independent from the core networks operated by the MNOs associated with the other profiles. For example, in a 4G LTE network, the evolved packet core (EPC) represents the core of the LTE network. The EPC is formed of multiple nodes, including the Home Subscriber Server (HSS) which is used to store subscriber information, current location, SIM details and authentication keys. The MNOs associated with the profiles are each associated with an independent EPC in the LTE network, such that an outage in an MNO that uses a first EPC can be circumvented by switching to an MNO that uses a different second EPC. The MNOs may have roaming agreements set up with other MNOs where the roaming agreement may either be a direct roaming relationship or an indirect roaming relationship via a GPRS roaming exchange (GRX) hub. As an example, MNO X may have a direct roaming relationship with MNO Z, whereas MNO Y may connect to MNO Z via a GRX hub. Independent MNO networks (e.g. MNO X and MNO Y) may each connect to the roaming MNO (MNO Z) using independent GRX hubs, or alternatively they may use the same GRX hubs with independent set ups and independent interconnects into these hubs.

The different MNOs may operate the same platform but on different instances including segregation of the physical infrastructure (e.g. Ericsson DCP, Jasper). For example, it would not be acceptable if the two networks share the same physical hardware even if they use different virtual machines. Since the chosen MNOs operate independent networks, and either independent platforms or different instances of the same platform, an outage in one MNO network can be circumvented by switching to another MNO, which operates a different independent network.

The eUICC 410 of the present embodiment comprises two profiles: (i) an 'Operational Profile', which is associated with MNO Y; and (ii) a 'Bootstrap Profile', which is associated with MNO X. Using the profiles, the eUICC 410 is connectable to either the MNO Y network or the MNO X network. In the present embodiment, the Operational Profile 440 is currently active which means that the eUICC 410 is connected to the MNO Y network.

In some embodiments, the set of profiles may comprise more than two profiles thereby enabling the eUICC to be connectable to more than two MNO networks. Such embodiments are described later in the present specification with reference to FIGS. 11a, 11b, 12a, 12b, and 13.

A small utility program which includes an algorithm, referred to herein as an 'Applet' 438, is held in secure memory 436, (also referred to herein as the secure transversal domain) and can be run on the processor 434. The Applet 438 is responsible for testing the connectivity of the MNO Y network. In the event that the Applet 438 identifies a connectivity outage in the MNO Y network, the Applet initiates a Fallback process, which requires the eUICC 410 to switch from the Operational Profile 440, which is associated with the MNO Y network, to the Bootstrap Profile 442, which is associated with the MNO X network. Connectivity of the eUICC 410 in the alarm network 400 is thus re-established. After a predetermined time frame of initiating the Fallback process, the Applet 438 initiates a Fallback Cancellation process, which allows the eUICC 410 to cancel the Fallback mechanism, thereby switching the eUICC 410 from the Bootstrap Profile 442 back to the Operational Profile 440. Once the switch has been made, the eUICC 410 is then able to re-connect with the MNO Y network via the Operational Profile 440. The switching logic which enables the eUICC to switch between the Operational Profile and the Bootstrap Profile is installed on the eUICC. The Bootstrap Profile 442 is installed at the point of manufacture of the eUICC and can be changed to be associated with a different MNO via an Over-the-Air (OTA) update (see below for discussion of OTA updates). The processes carried out by the Applet 438 are described in greater detail below with reference to FIGS. 7 to 10.

The Applet 438 is configurable Over-the-Air (OTA), such that eUICC 410 can be provided with updated MNO profiles and credentials as well as configuration settings. Each MNO profile resides in a secure area within the secure transversal domain on the eUICC SIM and so to configure the Applet 438 OTA in this way, the Applet 438 itself resides in the secure transversal domain on the eUICC 410 and provides a secure connection to the SIM card. The Applet 438 itself can also be installed and upgraded OTA. Since the Applet and the switching logic both reside on the eUICC, the eUICC can be retrofitted into any device. The Applet works within the necessary 3GPP/ETSI/GSMA standards and has been developed using a SIM Application Toolkit.

Figure 6:
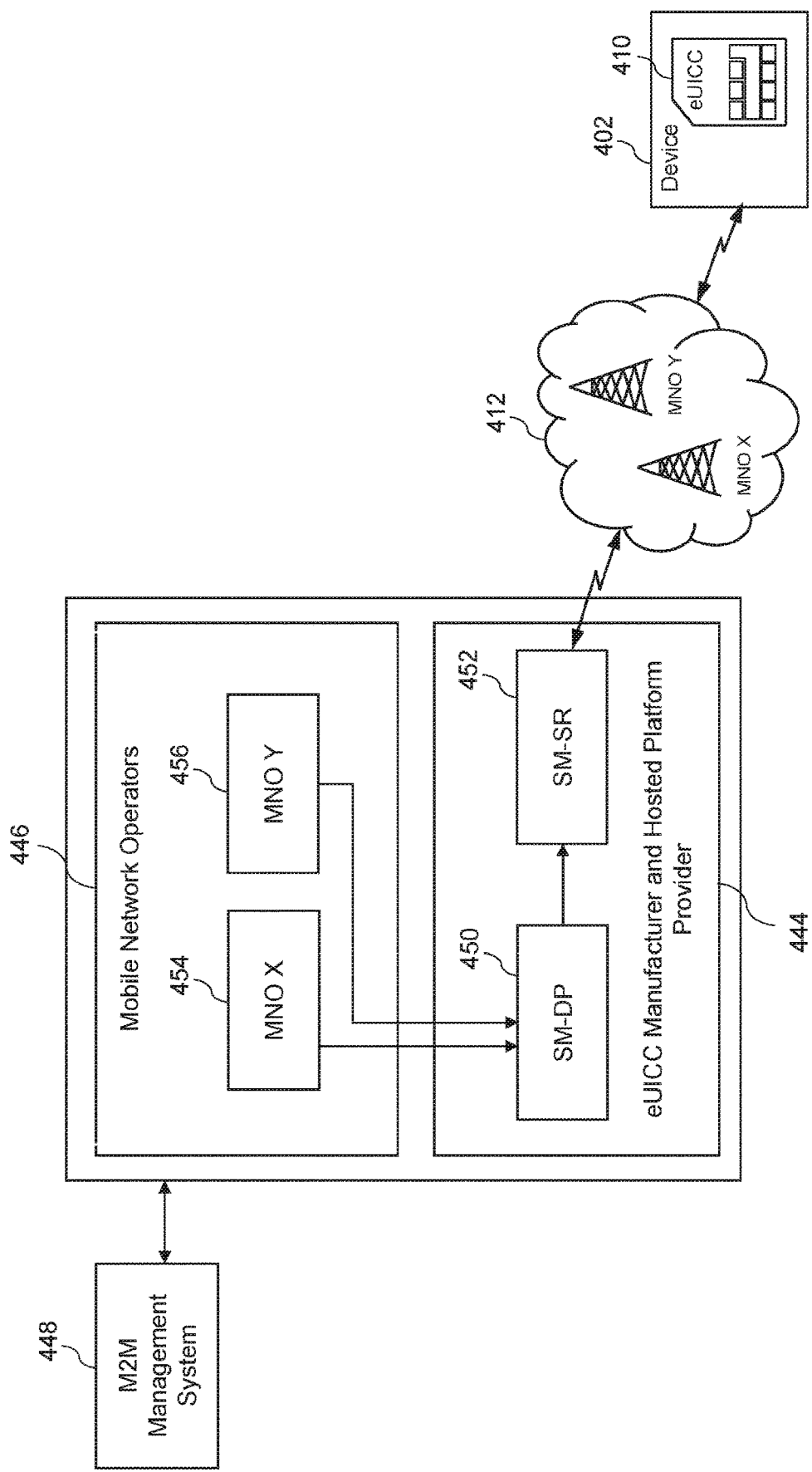
FIG. 6 is a schematic diagram showing components of the alarm network shown in FIG. 4 in greater detail.

The elements of the alarm network 400 that enable OTA updates to take place are shown in FIG. 6. A manufacturer and hosted platform provider 444 of the eUICC 410 is in radio communication with the eUICC 410 which is installed within the alarm device 402, using one of the available MNO networks 412. Available mobile network operators 446 are in communication with the manufacturer and hosted platform provider 444. The manufacturer and hosted platform provider 444, allows the eUICC 410 to be configured remotely with information from the mobile network operators 446. The available mobile network operators 446 and the manufacturer and hosted platform provider 444 are collectively in communication with a machine-to-machine (M2M) management system 448 which allows the alarm device 402 to be configured and managed remotely.

The manufacturer and hosted platform provider 444 comprises a Subscription Manager Data Preparation element (SM-DP) 450 and a Subscription Manager Secure Routing element (SM-SR) 452. The SM-DP 450 and the SM-SR 452 are two key network elements used by the available mobile network operators 446 for remotely managing the eUICC 410. In the present embodiment, the available mobile network operators 446 comprise MNO X 454 and MNO Y 456, which use the SM-DP 450 to securely encrypt their operator profiles for OTA installation within the eUICC 410. The SM-DP 450 sends the securely encrypted profiles to the SM-SR 452. Subsequently, the SM-SR 452 receives and then securely delivers the encrypted profiles to the eUICC 410 via radio communication. The eUICC 410 receives and installs the profiles, and once the profiles are installed, the SM-SR remotely manages the eUICC 410.

In other words, the SM-DP 450 is responsible for securely packaging and managing the installation of the MNO profiles onto the eUICC 410 and it effectively secures the communications link between the eUICC 410 and SM-DP 450 for the delivery of MNO profiles. The SM-SR 452 is responsible for ensuring the secure transport of commands to the eUICC 410 and managing the status of profiles on the eUICC 410 in order to load, enable, disable and delete profiles on the eUICC 410 as necessary. The SM-SR 452 also comprises a configuration area (not shown) that is created specifically for the Applet 438 of the eUICC 410. The configuration area enables OTA updates to be performed from the SM-SR 452 even where the Applet 438 resides in a secure transversal area of the eUICC 410.

Alternatively, OTA updates may be performed via the SIM OTA platform. In most present systems, the OTA server cannot access the transversal area of the eUICC and would not be able to make changes to the Applet on the eUICC, and so some modification to the OTA server would be needed. In order to address this, the eUICC 410 may use a profile, e.g. the Operational Profile or the Bootstrap profile, or alternatively a different profile, e.g. a maintenance profile. The OTA server requires modification only once, then the profile selected to address this issue (Operational profile, Bootstrap profile or maintenance profile) enables changes to the Applet 438 to be made because it is allowed to access the secure transversal domain of the eUICC 410.

Processes carried out by the Applet 438 will now be described with reference to FIGS. 7 to 10. In the present embodiment, the Operational Profile 440 is currently active which means that the eUICC 410 is connected to the MNO Y network. The Applet 438 performs its processes in three key stages. Firstly, in Stage 700, the Applet 438 tests the connectivity of the MNO Y network and identifies whether there is an outage. In the event that the Applet 438 identifies a complete connectivity outage in the MNO Y network, the Applet 438, in Stage 900, initiates a Fallback process. The Fallback process requires the eUICC 410 to switch from the Operational Profile 440, which is associated with the MNO Y network, to the Bootstrap Profile 442, which is associated with the MNO X network, Connectivity of the eUICC 410 in the alarm network 400 is thereby re-established using the MNO X network. Next, in Stage 1000, the Applet 438 initiates a Fallback Cancellation process after a predetermined time frame. The Fallback Cancellation process allows the eUICC 410 to cancel the Fallback mechanism, thereby switching the eUICC 410 from the Bootstrap Profile 442 back to the Operational Profile 440. Once the switch has been made, the eUICC 410 is then able to re-connect with the MNO Y network via the Operational Profile 440.

As noted above, the Applet 438 is responsible for testing the connectivity of the MNO Y network. As part of Stage 700, the Applet 438 first tests, at Step 702, the connectivity of the MNO Y network a predetermined number of times. The Applet 438 then checks, at Step 704, whether the connectivity tests have been successful. If the tests have been successful, the Applet 438 loops back to continue testing, at Step 702, the connectivity of the MNO Y network. However, if the tests have not been successful, the Applet 438 proceeds to check, at Step 706, whether there has been a complete connectivity outage in the MNO Y network. If from the check the Applet 438 determines that there has been a complete connectivity outage in the MNO Y network, the Applet 438 continues to Stage 900 of the process to initiate the Fallback process. If, however, the Applet 438 determines that there has not been a complete connectivity outage in the MNO Y network, the Applet 438 loops back to continue testing, at Step 702, the connectivity of the MNO Y network.

Figure 8:
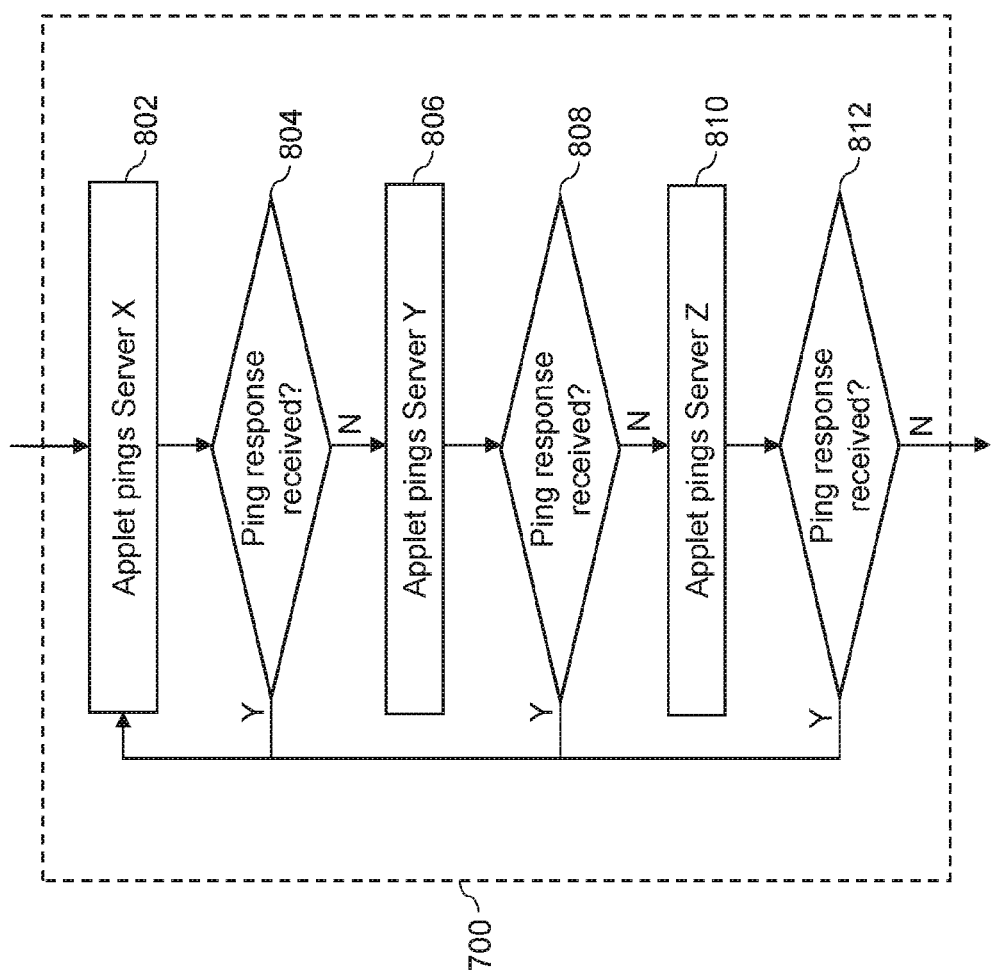
FIG. 8 is a flow diagram showing the process by which the connectivity of the eUICC is tested in FIG. 7 in greater detail.

In the present embodiment, the Applet 438 uses ping testing to test the connectivity of the eUICC with the MNO Y network, as shown in FIG. 8. A ping test determines whether the alarm device 402 in which the eUICC 410 is installed is able to communicate with a server across the alarm network 400. It does this by sending a data packet to the server and waiting for a data packet back in response. In cases where network communication is successfully established, the ping test also determines the connection latency (the time it takes for the ping (data packet) to return to the device 402) between the alarm device 402 and the server. In the present embodiment, the Applet 438 runs a series of pings to different servers in the alarm network 400, namely Server X, Server Y and Server Z (not shown). The servers are independent and geographically-dispersed.

Figure 7:
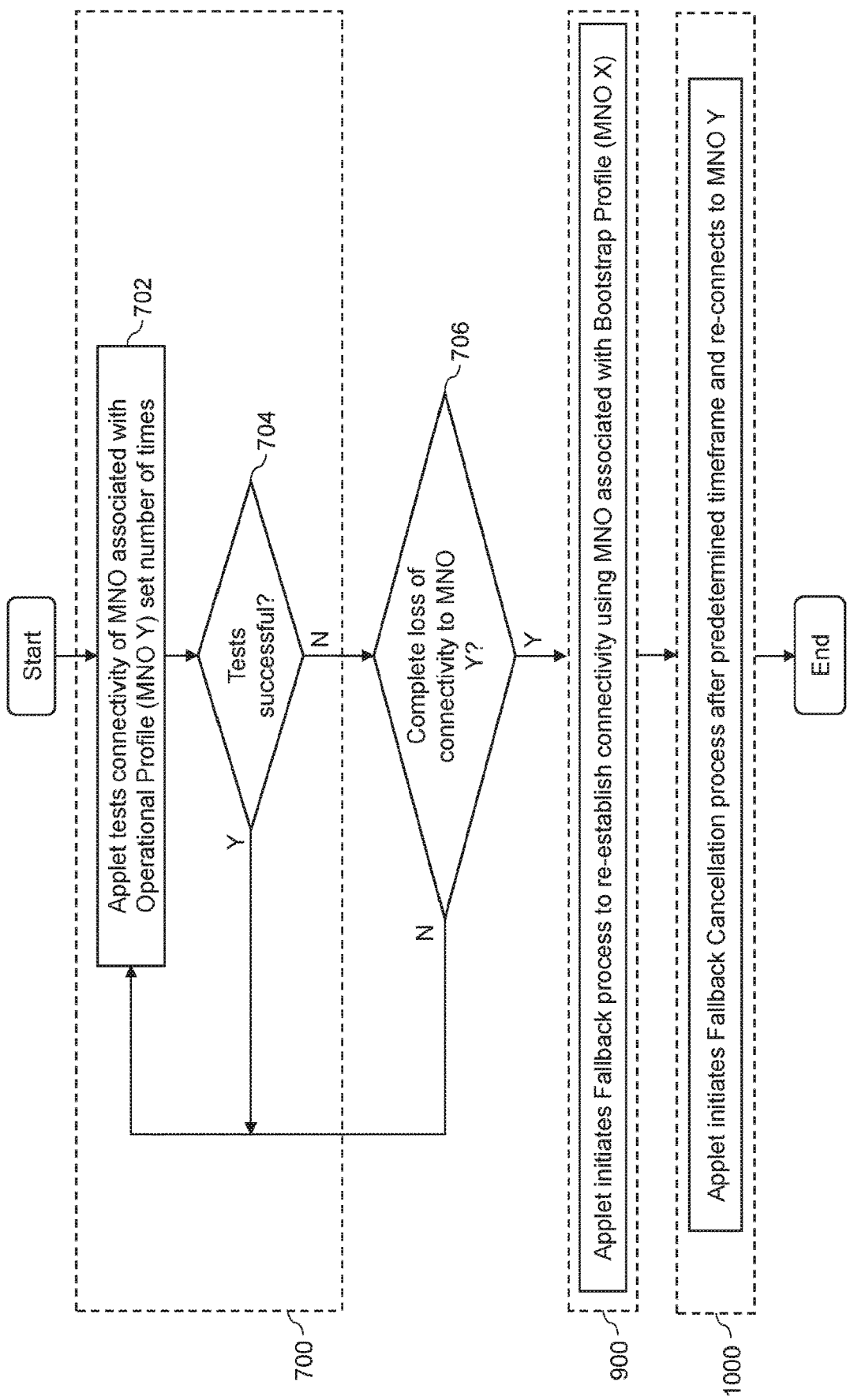
FIG. 7 is a flow diagram showing the process by which connectivity of the eUICC is maintained in the event of an outage in the active MNO network, in accordance with the first embodiment.

The Applet 438 begins ping testing by sending, at Step 802, a ping to or 'pinging' Server X. The Applet 438 then checks, at Step 804, whether a response to the ping has been received from Server X. The Applet 438 begins checking for a response immediately after the ping is sent to Server X. In the event that a response to the ping is received from Server X, the Applet 438 loops back to ping Server X again, at Step 802. When a response from Server X is consistently being received after being pinged, this results in a connectivity heartbeat which indicates normal operation and connectivity with Server X and the MNO Y network. If a response to the ping is not received from Server X within a configurable predetermined time period, e.g. 4 seconds, then the Applet 438 continues to Step 806, where the Applet 438 sends a ping to Server Y. The Applet 438 then checks, at Step 808, whether a response to the ping has been received from Server Y. In the event that a response to the ping is received from Server Y, the Applet 438 loops back to re-start ping testing by pinging Server X again, at Step 802. If a response to the ping is not received from Server Y within a configurable predetermined time period, e.g. 4 seconds, then the Applet 438 continues to Step 810, where the Applet 438 sends a ping to Server Z. The Applet 438 then checks, at Step 812, whether a response to the ping has been received from Server Z. In the event that a response to the ping is received from Server Z, the Applet 438 loops back to re-start ping testing by pinging Server X again, at Step 802. If a response to the ping is not received from Server Z within a configurable predetermined time period, e.g. 4 seconds, then this means that three consecutive ping tests (namely, a ping sequence) have been unsuccessful, Following a first unsuccessful ping sequence, the Applet 438 then repeats Steps 802 to 812 another two times in order to twice repeat the performance of the ping sequence. If at the end of the third and final ping sequence a response to the ping to Server Z is not received, then the Applet determines whether there is a complete connectivity outage at Step 706 as shown in FIG. 7.

At Step 706, the Applet 438 determines whether there has been a complete loss of connectivity or 'connectivity outage' between the eUICC 410 and the MNO Y network, based on the occurrence of three consecutive failed ping sequences. If the Applet 438 determines that there has not been a complete loss of connectivity with the MNO Y network, then the Applet 438 loops back to re-test, at Step 702, connectivity of the eUICC 410 with the MNO Y network. However, if the Applet 438 determines that there has been a complete loss of connectivity, then the Applet 438 continues to Stage 900 to initiate the Fallback process.

Figure 9:
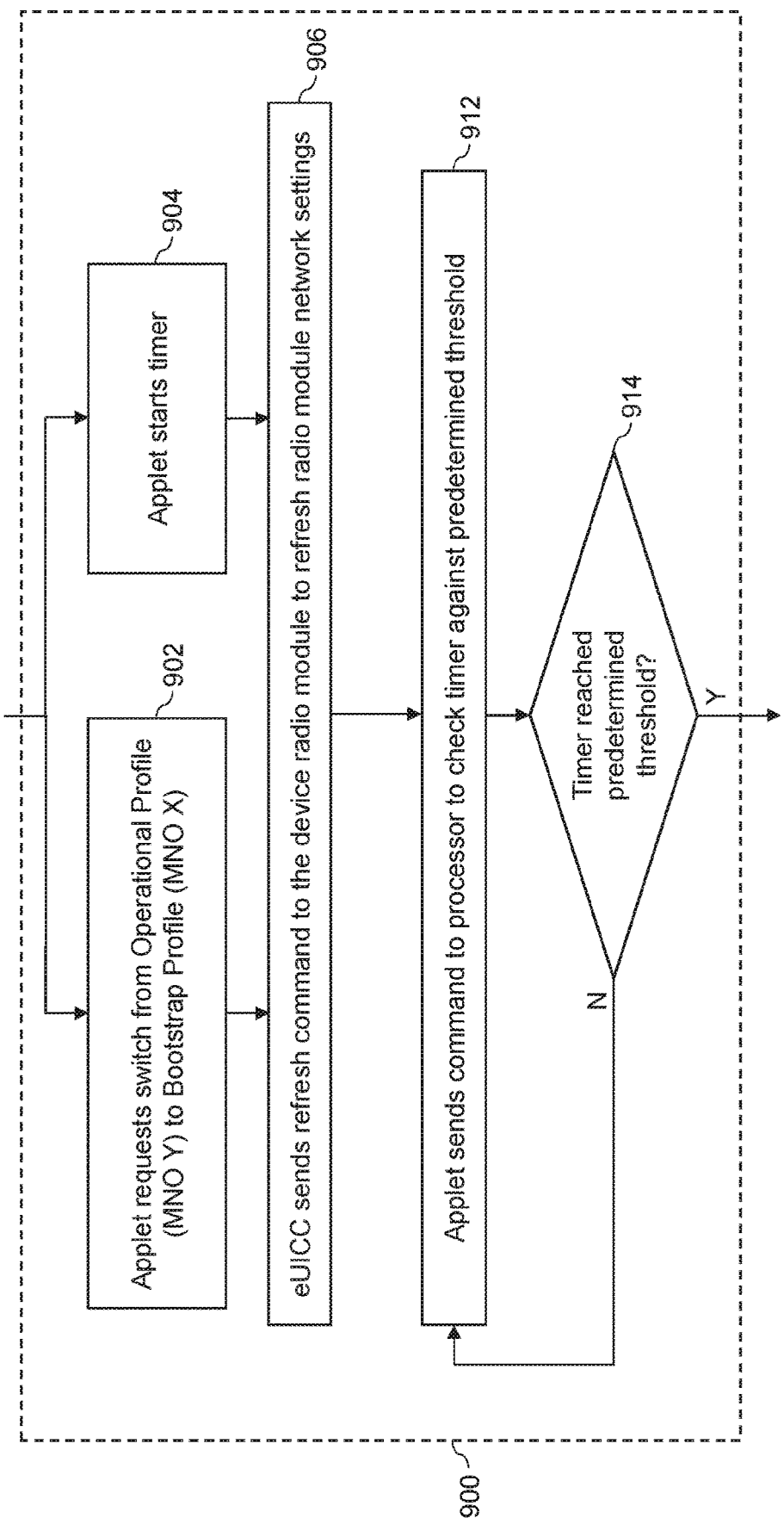
FIG. 9 is a flow diagram showing the process by which the Fallback process of FIG. 7 is carried out in greater detail, in accordance with the first embodiment.

The Fallback process initiated by the Applet 438 in Stage 900 will now be described in greater detail with reference to FIG. 9. Firstly, the Applet 438 submits, at Step 902, a request to the processor 434 of the eUICC 410 to switch from the Operational Profile 440, which is associated with the MNO Y network, to the Bootstrap Profile 442, which is associated with the MNO X network. Simultaneously, the Applet 438 submits, at Step 904, a request to the processor 434 of the eUICC 410 to start a timer.

As part of the Fallback process, the network settings of the radio module 406 of the alarm device 402 need to be refreshed for the radio module 406 to connect to the MNO X network. The eUICC therefore sends, at Step 906, a refresh command to the radio module 406 to initiate a refresh of the network settings, as part of the Fallback process. This enables the network settings of the radio module to be updated to the MNO X network.

The Applet then sends, at Step 912, a command to the processor 434 of the eUICC 410 to check the timer against a predetermined threshold. This check is carried out, at Step 914, and if the timer has reached a predetermined threshold, then the process continues to Stage 1000 to initiate the Fallback Cancellation process and thereby reconnect to the MNO Y network. If, however, the result of the check, at Step 914, indicates that the timer has not reached the predetermined threshold, then the process loops back to where the Applet 438 re-sends, at Step 912, a command to the processor 434 to check the timer against the predetermined threshold.

The Fallback Cancellation process initiated by the Applet 438 in Stage 1000 will now be described in greater detail with reference to FIG. 10. As discussed previously, the Fallback Cancellation process allows the eUICC 410 to cancel the Fallback mechanism, thereby switching the eUICC 410 from the Bootstrap Profile 442 back to the Operational Profile 440. The Applet 438 determines, at Step 1002, a time slot (a period of time) in which to begin the Fallback Cancellation process. For example, the Applet 438 receives input from the device 402 after a predetermined time period, e.g. every 30 seconds, to indicate that the predetermined time period has passed, such that each time the Applet 438 receives an input, the Applet 438 adds one to a counter. Once the counter reaches a predetermined number of counts, e.g. three counts, the Applet 438 initiates the Fallback Cancellation process. There are likely to be a plurality of alarm devices 402 in the alarm network 400 such that an eUICC in each of the alarm devices 402 is capable of carrying out the processes described herein. If multiple eUICCs are switched back to the Operational Profile at the same time, then this can produce a so-called 'signalling storm' and thereby overload the MNO Y network. This could cause further MNO outages. The Applet 438 has a built-in mechanism for spreading the switching of the eUICCs 410 back onto the Operational Profile 440 over time after the Fallback Cancellation process is initiated. This solves a technical problem in that it prevents a signalling storm with the MNO associated with the Operational Profile 440, namely MNO Y in the present embodiment. The time slot may be determined, for example, using the last digit of the IMEI, ICCID, EID, or MISDEN codes of the eUICC. The time slot may be determined in other ways, for example by randomising the period of time after which the switch from the Bootstrap Profile 442 to the Operational Profile 440 will take place.

Once the time slot in which to begin Fallback Cancellation has been determined, the Applet 438 sends, at Step 1004, a command to the processor 434 to determine whether the time slot has been reached. The Applet 438 proceeds to check the current time against the time slot accordingly at Step 1006. Namely, if the time slot has not been reached, then the process loops back for the Applet 438 to re-send, at Step 1004, a command to the processor 434 to check whether the time slot has been reached. If the time slot has been reached, then the process continues and the Applet 438 submits, at Step 1008, a request to the processor 434 of the eUICC 410 to switch from the Bootstrap Profile 442, which is associated with the MNO X network, to the Operational Profile 440, which is associated with the MNO Y network. The Applet 438 then checks, at Step 1010, whether connectivity has been established using the MNO Y network. If connectivity with the MNO Y network is not established, then the Applet 438 initiates a Fallback Process to switch the eUICC 410 from the Operational Profile 440 back to the Bootstrap Profile 442 in order to establish connectivity with the MNO X network. Namely, the process loops back, at Step 1012, to the beginning of Stage 900 to undergo the Fallback Process. If, however, connectivity with the MNO Y network is established at Step 1010, the eUICC 410 is connected to the MNO Y network successfully and the process ends.

It should be noted that although the present embodiment uses time as a point of reference for initiating the Fallback Cancellation process—namely, a time period between two points is measured and compared to a threshold in order to determine a time slot in which to begin Fallback Cancellation—other means are also viable. For example, the Applet may count the number of interactions or event triggers between the eUICC and the device and/or network, and initiate the Fallback Cancellation process after a predetermined count of such interactions or events has been reached. Alternatively, the Applet may use any combination of time, interactions and events to determine the point at which the Fallback Cancellation process is initiated.

In the embodiments described above with reference to FIGS. 4 to 10, the eUICC 410 comprises two profiles: (i) the Operational Profile 440, which is associated with MNO Y; and (ii) the Bootstrap Profile 442, which is associated with MNO X. Embodiments in which the set of profiles comprises more than two profiles, thereby enabling the eUICC to be connectable to more than two NANO networks, will now be described with reference to FIGS. 11*a*, 11*b*, 12*a*, 12*b*, and 13.

Figure 11B:
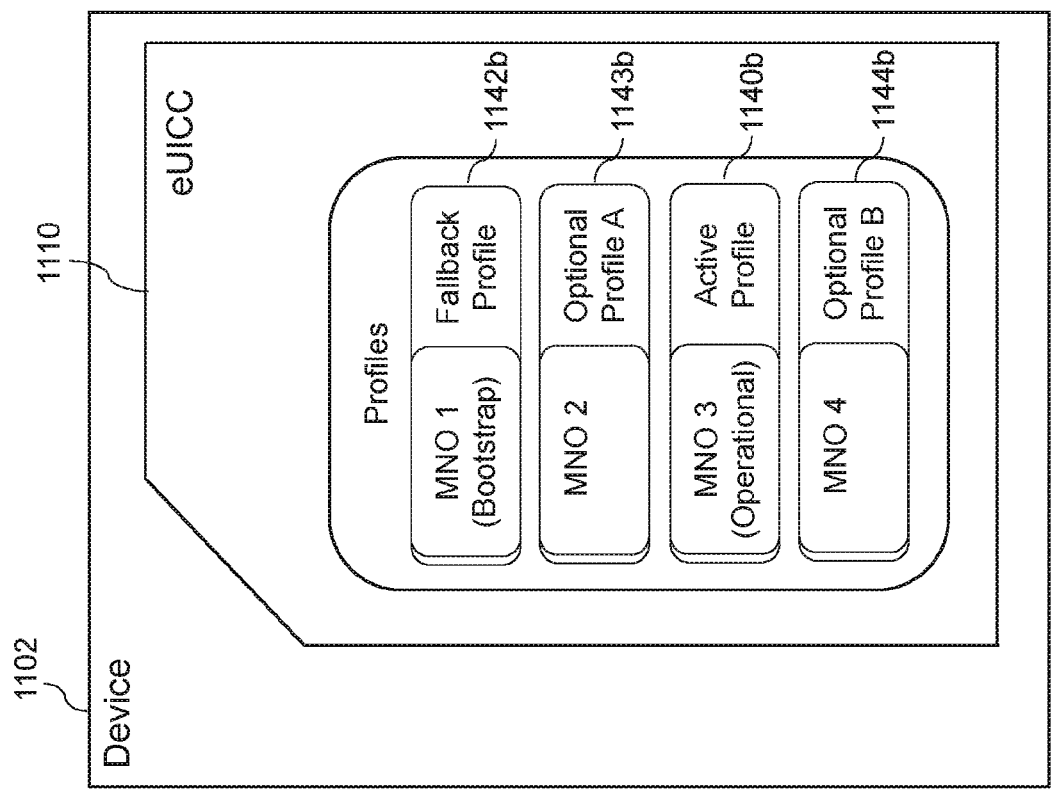
FIG. 11b is a schematic diagram showing the eUICC of FIG. 11a, after an optional profile has been selected, in accordance with the second embodiment of the present invention.
Figure 11A:
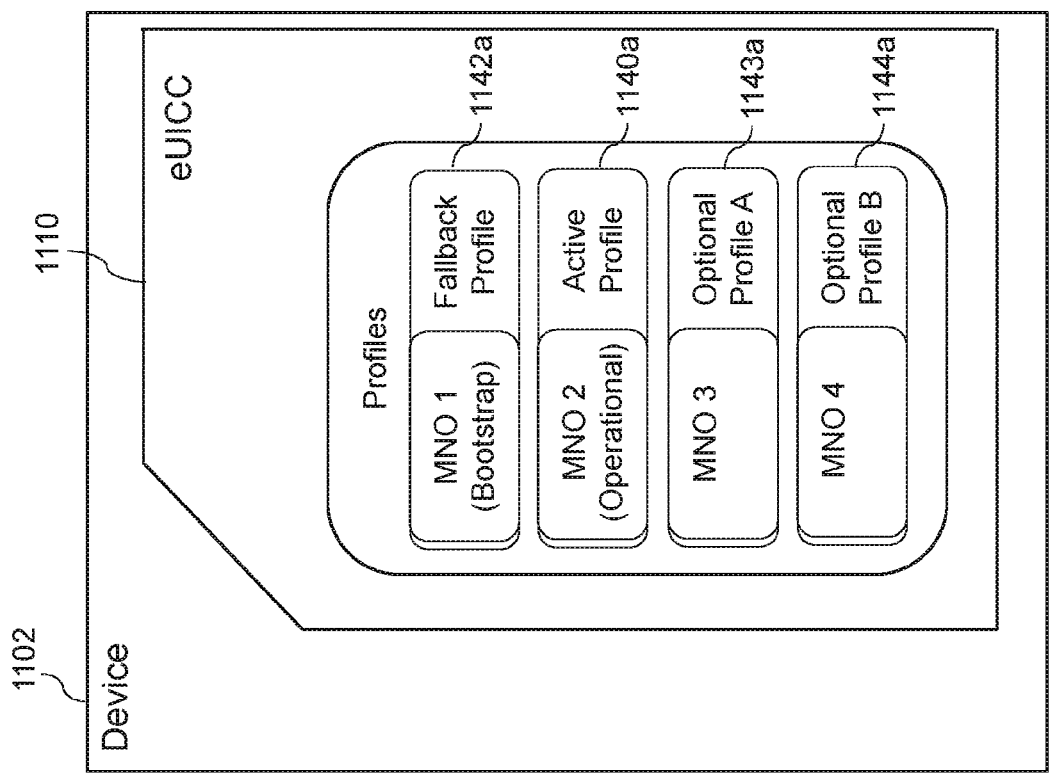
FIG. 11a is a schematic diagram showing an eUICC comprised within an alarm device, before an optional profile has been selected, in accordance with a second embodiment of the present invention.

An eUICC 1110 according to a second embodiment of the present invention is shown in FIGS. 11*a* and 11*b*. The second embodiment is similar to the first embodiment and, as such, the following description will focus on the differences between the embodiments.

The eUICC 1110 is installed within an alarm device 1102 providing an M2M solution. The alarm device 1102 forms part of an alarm network as described above with reference to FIG. 4, where the alarm network provides a communications channel between an alarm device 1102 and a remote alarm-receiving centre. The alarm device 1102 and eUICC 1110 comprise the features of the alarm device 402 and the eUICC 410, respectively, shown in FIG. 5 although these features are not shown in FIG. 11*a*, The difference between the first and second embodiments lies in the profiles that are stored in the eUICC 1110. The eUICC 1110 comprises four profiles: (i) a Bootstrap Profile 1142*a*, which is associated with MNO 1; (ii) an Operational Profile 1140*a*, which is associated with MNO 2; (iii) an Optional Profile A 1143*a*, which is associated with MNO 3; and (iv) an Optional Profile B 1144*a*, which is associated with MNO 4. It should be noted that the profiles comprised within the eUICC 1110 are domestic profiles associated with MNOs, which provide connectivity in the country in which it operates its own physical network. The domestic profiles are therefore associated with MNOs providing connectivity in the same country that the eUICC 1110 and alarm device are operating in. The eUICC may also comprise roaming profiles in addition to domestic profiles and this is described in greater detail in respect of the fourth embodiment and with reference to FIG. 13.

Using the domestic profiles shown in FIG. 11*a*, the eUICC 1110 is connectable to the MNO 1 network, MNO 2 network, MNO 3 network or MNO 4 network. In the present embodiment as shown in FIG. 11*a*, the Operational Profile 1140*a* is currently active which means that the eUICC 1110 is connected to the MNO 2 network. The MNO network supplying network connectivity, i.e. being associated with the Operational Profile, can be selected from an alarm server in the alarm network. Optional Profile A 1143*a* and Optional Profile B 1144*a* would be presented as options at the server enabling control of which MNO is to provide network connectivity.

The Applet (not shown in FIG. 11*a* or 11*b*) within the eUICC 1110 is able to carry out the processes as detailed above with reference to the flow diagrams of FIGS. 7 to 10. Namely, the Applet tests the connectivity of the MNO 2 network which is associated with the Operational Profile 1140*a* (Stage 700, FIG. 7), and in the event of a loss of connectivity to the NANO 2 network, the Applet initiates a Fallback Process to re-establish connectivity with the MNO 1 network which is associated with the Bootstrap Profile 1142a (Stage 900, FIG. 7). After a predetermined time frame, the Applet initiates a Fallback Cancellation process and re-connects to the MNO 2 network (Stage 1000, FIG. 7).

FIG. 11b shows the profiles within the eUICC 1110 after Optional Profile A 1143a has been selected such that MNO 3 can provide network connectivity. As such, the Operational Profile 1140b of FIG. 11b is now associated with the MNO 3 network. The Bootstrap Profile 1142b remains associated with the MNO 1 network. Optional Profile A 1143a is now associated with the MNO 2 network and the profile can be switched back to the MNO 2 network if desired. Optional Profile B 1144a remains associated with the MNO 4 network.

Alternatively, the eUICC 1110 shown in FIGS. 11a and 11b could be installed in a consumer device such as a smartphone. In this case, the MNO network supplying network connectivity, i.e. being associated with the Operational Profile, can be selected by the user of the device. Through an input device such as a touchscreen, the consumer device may present Optional Profile A 1143a and Optional Profile B 1144a as options to enable the user to actively choose which MNO is to provide network connectivity. After switching to one of the optional profiles 1143a, 1144a, the user has the option of switching back to the MNO 2 network if desired by selecting Optional Profile A 1143b.

Figure 12B:
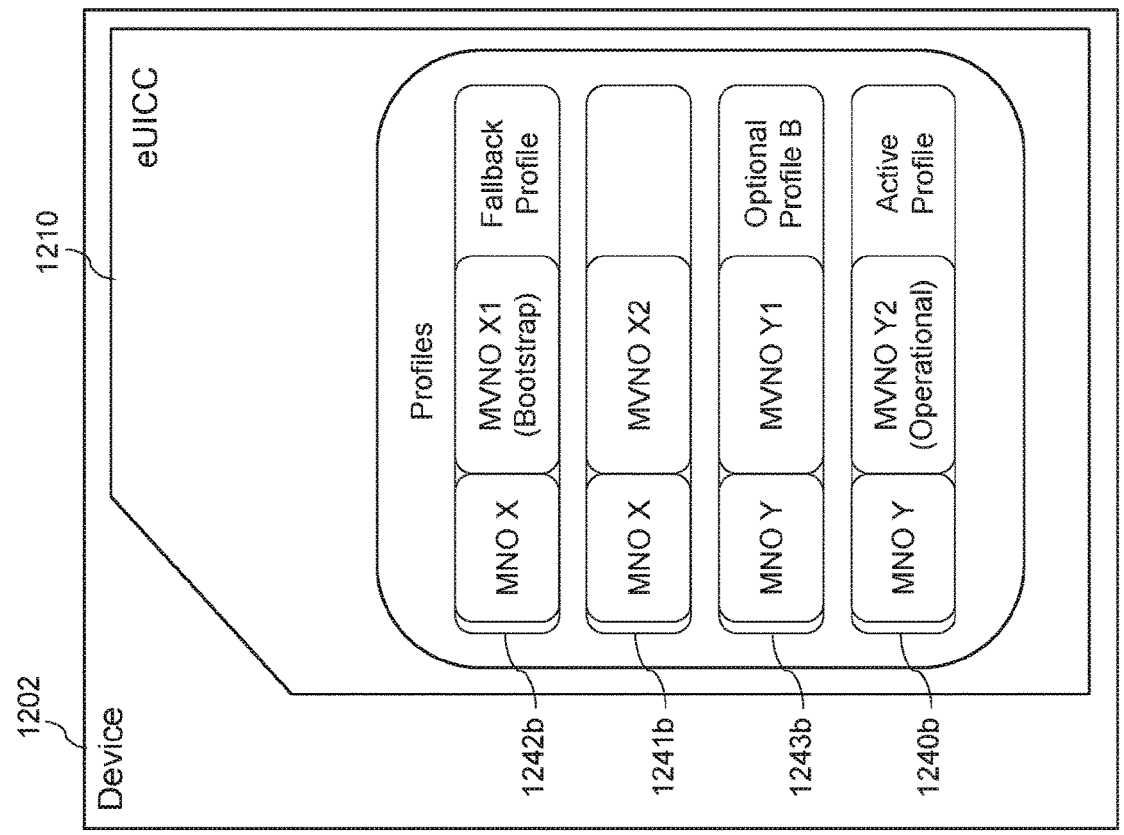
FIG. 12b is a schematic diagram showing the eUICC of FIG. 12a after an optional profile has been selected, in accordance with the third embodiment of the present invention.
Figure 12A:
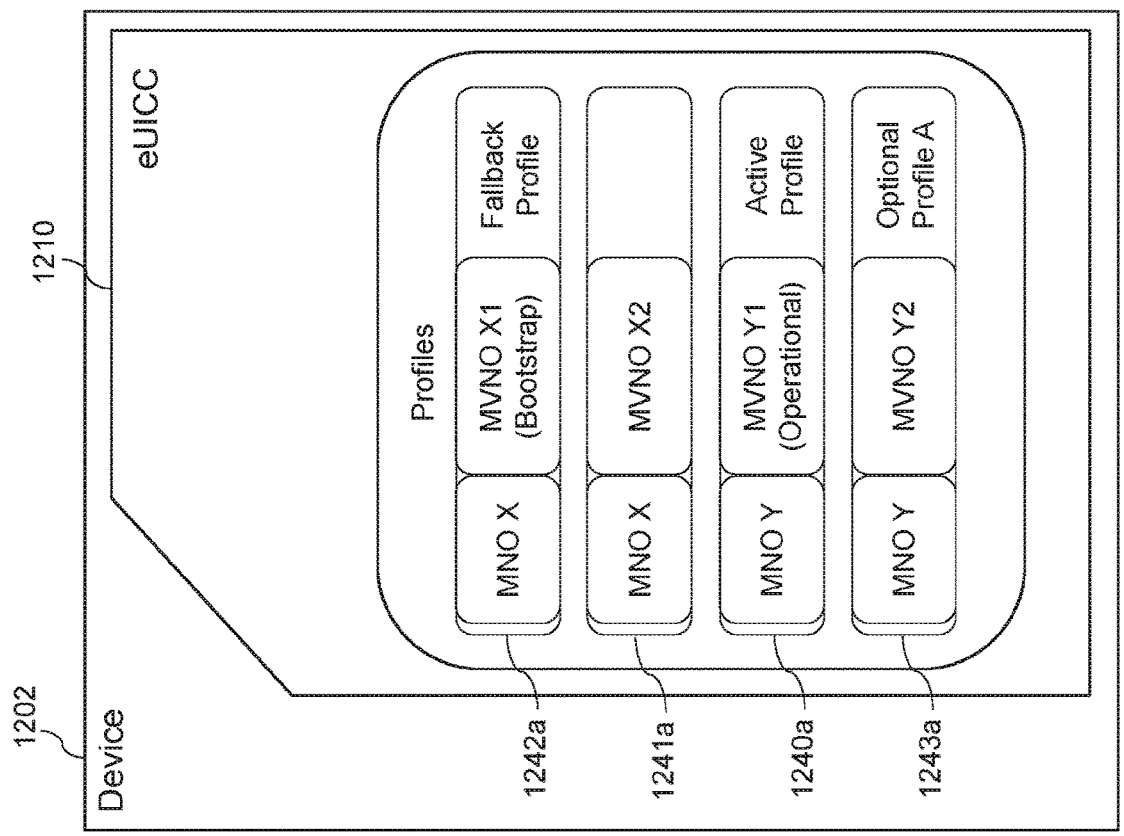
FIG. 12a is a schematic diagram showing an eUICC comprised within an alarm device, wherein the eUICC comprises profiles associated with mobile virtual network operators which have agreements with mobile network operators, before an optional profile has been selected, in accordance with a third embodiment of the present invention.

An eUICC 1210 according to a third embodiment of the present invention is shown in FIGS. 12a and 12b. The third embodiment is similar to the second embodiment and, as such, the following description will focus on the differences between the second and third embodiments.

The eUICC 1210 comprises profiles associated with mobile virtual network operators (MVNOs), where each MVNO has an agreement with an MNO such that it can use the MNO's network infrastructure to provide services to its customers.

Accordingly, the eUICC 1210 comprises a Bootstrap Profile 1242a, which is associated with MVNO X1. MVNO X1 has an agreement with MNO X to use the network infrastructure of MNO X.

The eUICC 1210 further comprises an Operational Profile 1240a, which is associated with MVNO Y1. MVNO Y1 has an agreement with MNO Y to use the network infrastructure of MNO Y.

The eUICC 1210 comprises two additional profiles 1241a, 1243a, The first additional profile 1241a is associated with MVNO X2, which has an agreement with MNO X. The second additional profile 1243a (referred to below and in FIG. 12a as 'Optional Profile A' 1243a) is associated with MVNO Y2, which has an agreement with MNO Y.

Using the profiles, the eUICC 1210 is connectable to the MNO X network or the MNO Y network, via one of the respectively associated MVNOs. In the present embodiment as shown in FIG. 12a, the Operational Profile 1240a is currently active and so the eUICC 1210 is connected to the MNO Y network. The MNO network supplying network connectivity can be selected at the server (not shown) in the case that the device 1202 is an M2M device, or selected by a user via an input device (not shown) such as a touchscreen in the case that the device 1202 is a consumer device. The Operational Profile and the Bootstrap Profile should be associated with different MNOs in order for the Fallback and Fallback Cancellation processes to be effective. As the Bootstrap Profile 1242a is associated with MNO X, Optional Profile A 1243a, which is associated with MNO Y via MVNO Y2, is presented as the only other option if an alternative profile is desired. The first additional profile 1241a associated with MVNO X2 is currently not available for selection.

The Applet (not shown in FIG. 12a or 12b) within the eUICC 1210 is able to carry out the processes as detailed above with reference to the flow diagrams of FIGS. 7 to 10.

FIG. 12b shows the profiles within the eUICC 2110 after Optional Profile A 1243a has been selected such that MNO Y can provide network connectivity via MVNO Y2. As such, the Operational Profile 1240b of FIG. 12b is now associated with MVNO Y2. The server (if the device 1202 is an M2M device) or the user (if the device 1202 is a consumer device) can switch back to MVNO Y1 using Optional Profile B 1243b as required. The Bootstrap Profile 1242b remains associated with the MVNO X1. However, the Bootstrap Profile 1242b is configurable OTA and so can be changed to be associated with a different profile but still on a different MNO to the Operational Profile, e.g. using the additional profile 1241b associated with MVNO X2.

Figure 13:
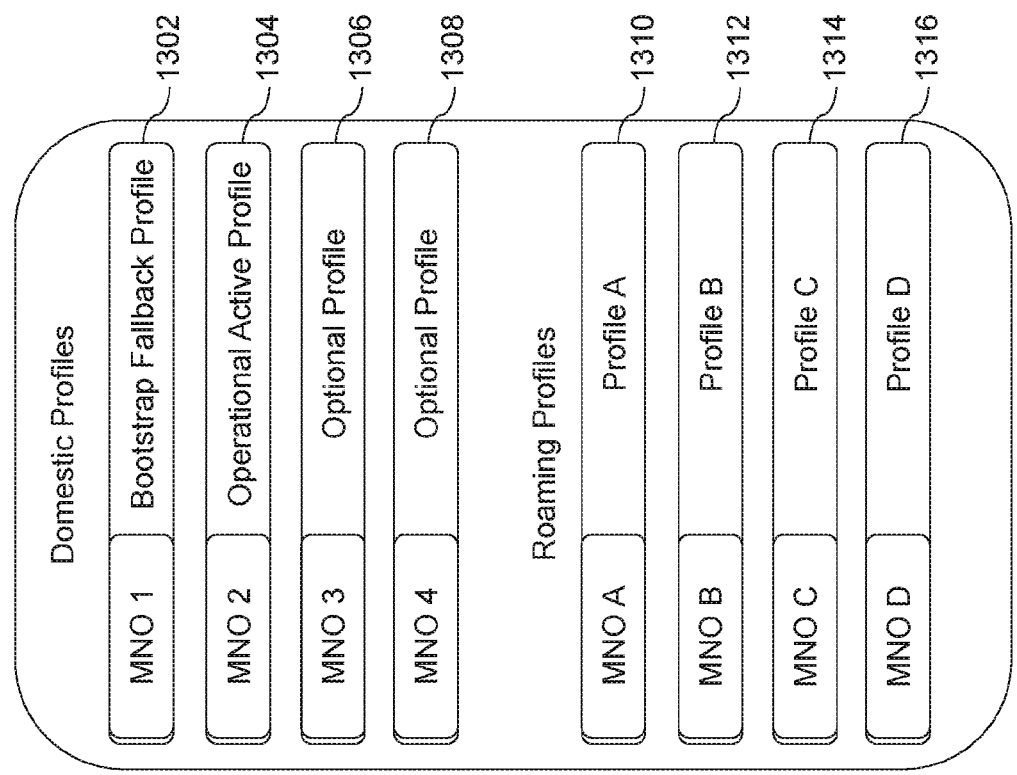
FIG. 13 is a schematic diagram showing domestic and roaming profiles which can be comprised within an eUICC, in accordance with a fourth embodiment of the present invention.

Profiles provided within an eUICC according to a fourth embodiment of the present invention are shown in FIG. 13. The fourth embodiment is similar to the second embodiment and, as such, the following description will focus on the differences between the second and fourth embodiments. The eUICC of the second embodiment comprises domestic profiles associated with MNOs, which each provide connectivity in the country in which they operate their own physical network. The domestic profiles are therefore associated with MNOs providing connectivity in the same country that the eUICC and alarm device are operating in.

In contrast, in addition to domestic profiles, the eUICC of the present embodiment comprises roaming profiles. Roaming profiles enable an eUICC operating in a first country to access MNO networks that operate in a second country. The eUICC is thus provided with roaming network access in addition to domestic network access. As such, the eUICC has access, via the roaming profiles, to the available networks that the MNO providing the profile has roaming agreements with.

As shown in FIG. 13, the eUICC comprises four domestic profiles 1302, 1304, 1306, 1308 and four roaming profiles 1310, 1312, 1314, 1316. Each of the profiles is associated with a different MNO. Namely, the domestic profiles are associated with MNO 1, MNO 2, MNO 3 and MNO 4, respectively, which operate in the same country as the eUICC. The roaming profiles are associated with MNO A, MNO B, MNO C and MNO 0, respectively, which operate in a different country to the eUICC. For the domestic profiles, the Domestic Operational Profile 1304 is associated with MNO 2 and the Domestic Bootstrap Profile 1302 is associated with MNO 1.

As with previous embodiments, one of the optional domestic profiles 1306, 1308, which are each associated with different MNOs to the current Operational and Bootstrap Profiles, can be selected to function as the Domestic Operational Profile.

Figure 14:
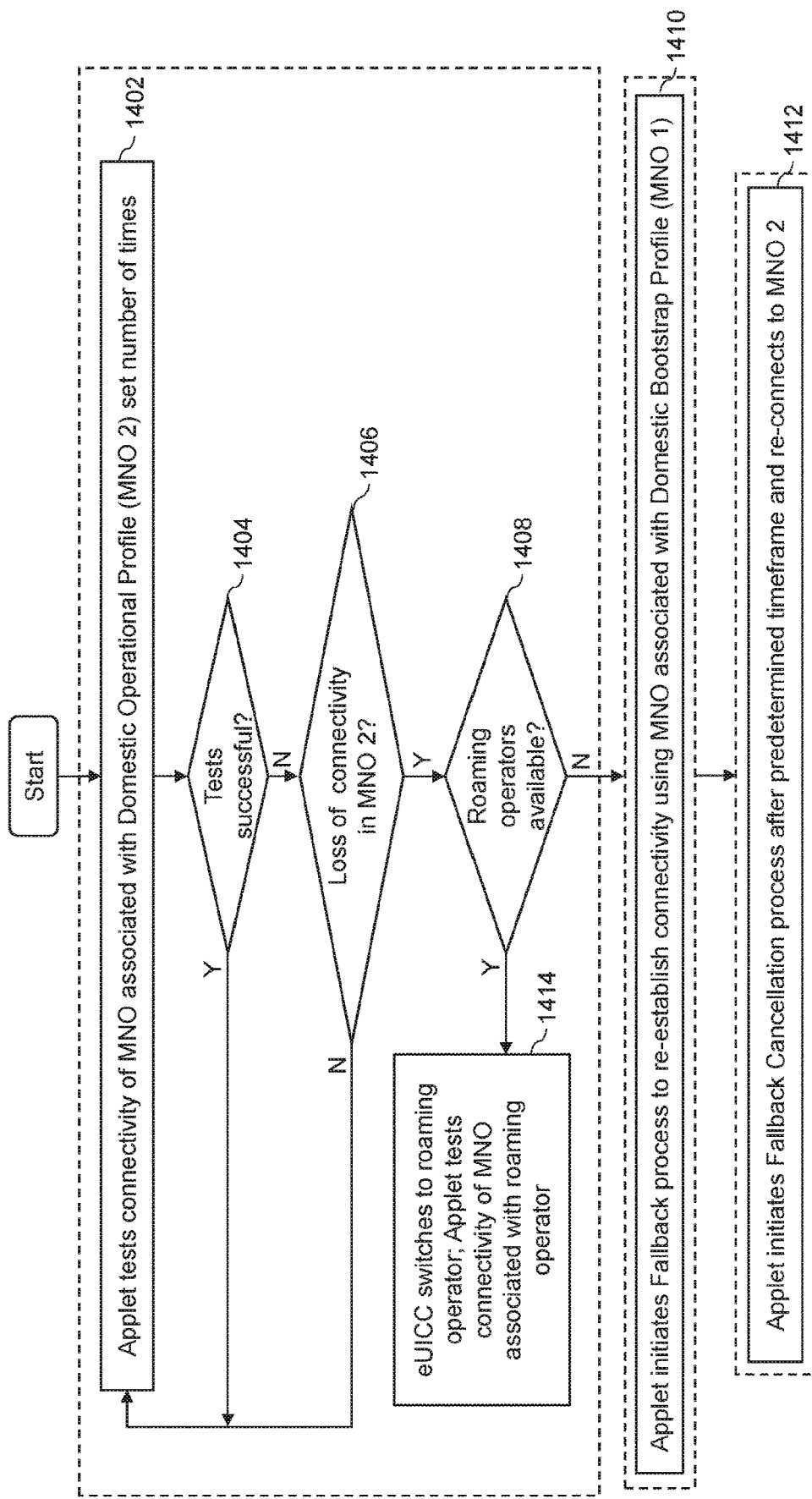
FIG. 14 is a flow diagram showing the process by which connectivity of the eUICC is maintained in the event of an outage in the active MNO network where both domestic and roaming profiles are available, in accordance with the fourth embodiment.

The process by which the domestic profiles and roaming profiles are utilised by the Applet of this embodiment is shown in FIG. 14. First, the Applet tests, at Step 1402, the connectivity of the MNO network associated with the Domestic Operational Profile 1304, namely MNO 2. The Applet then checks, at Step 1404, whether the connectivity tests have been successful. If the connectivity tests have been successful, the process loops back to continue to test connectivity, at Step 1402. If the connectivity tests have not been successful, the process continues to check, at Step 1406, whether there has been a complete loss of connectivity with the MNO 2 network. If the Applet determines that there has not been a loss of connectivity, then the process loops back to continue to test connectivity, at Step 1402. If, however, it is determined that there has been a loss of connectivity with the MNO 2 network, the device notifies the eUICC accordingly. The Applet allows the eUICC a predetermined amount of time after this notification to search for available roaming operators to find connectivity. In one embodiment, the applet allows sufficient time for the SIM/device to roam across several networks, typically three networks. If the eUICC does not find connectivity via a roaming operator within the predetermined amount of time, the Applet then triggers the Fallback and Fallback Cancellation processes.

Once notified of a loss of connectivity, the eUICC or the device checks, at Step 1408, whether there are any roaming operators available. If the eUICC determines that there is a roaming operator available, then the eUICC switches, at Step 1414, to the available roaming operator. Once connected to the available roaming operator, the Applet tests, also at Step 1414, the connectivity of the MNO associated with the roaming operator. The connectivity testing performed by the Applet is analogous to that carried out in Steps 1402, 1404 and 1406.

The roaming process effectively enables the eUICC to roam between the available roaming operators to find connectivity. If no roaming operators are available, then the Applet continues to initiate the Fallback and Fallback Cancellation processes as per Steps 1410 and 1412, in the same manner as previously described embodiments.

This process enables the eUICC to switch between MNOs and thus has the potential to quickly identify a roaming operator that can provide connectivity when connectivity is initially lost. Advantageously, this provides a first layer of resilience.

Figure 15:
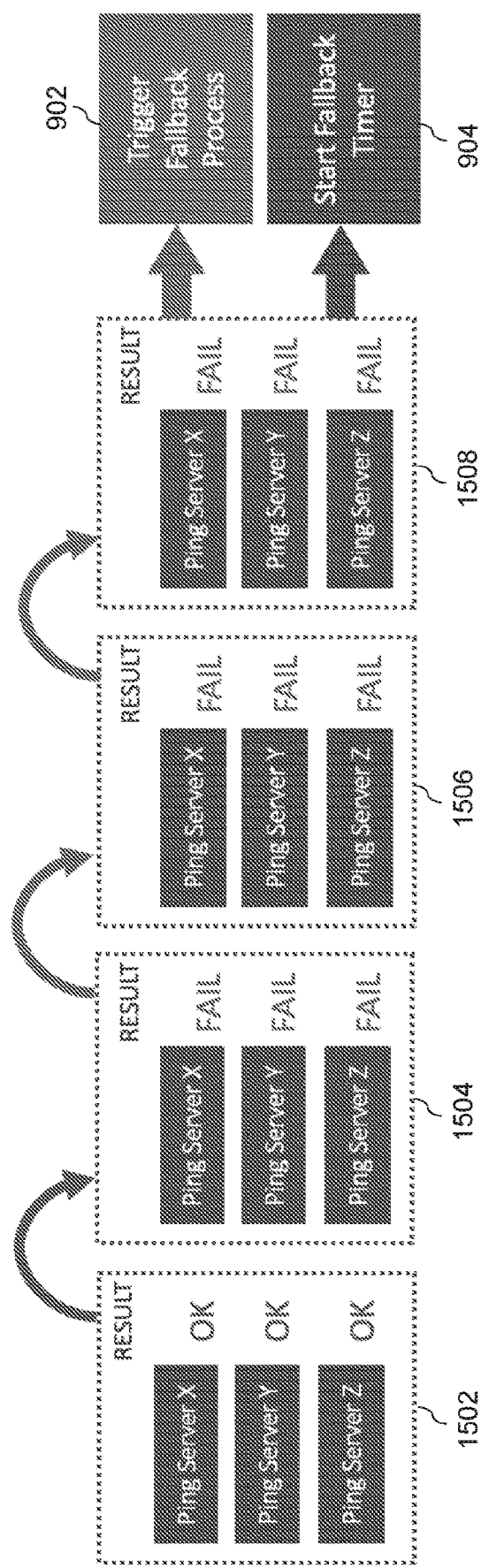
FIG. 15 is an alternative schematic diagram showing the process by which the connectivity of the eUICC is tested in FIG. 8.

The connectivity tests carried out by the Applet will now be described in further detail with reference to FIGS. 15 to 17. FIG. 15 shows a schematic version of the process of using ping as the connectivity test and subsequently initiating a Fallback Process as described above with reference to FIGS. 7 to 9. In particular, the diagram shows a series of ping tests, where each ping test involves pinging Server X, Server Y and Server Z, being carried out and the results of each test. A first ping test 1502 results in a ping response being received from all three servers. As a result of a second ping test 1504, however, no ping responses are received. The connectivity test continues onto a third ping test 1506, and subsequently onto a fourth ping test 1508, both of which result in no ping responses being received from any of the servers. Three consecutive failed ping tests leads to the Fallback process being triggered at Step 902 and the Fallback timer being started at Step 904.

Figure 16:
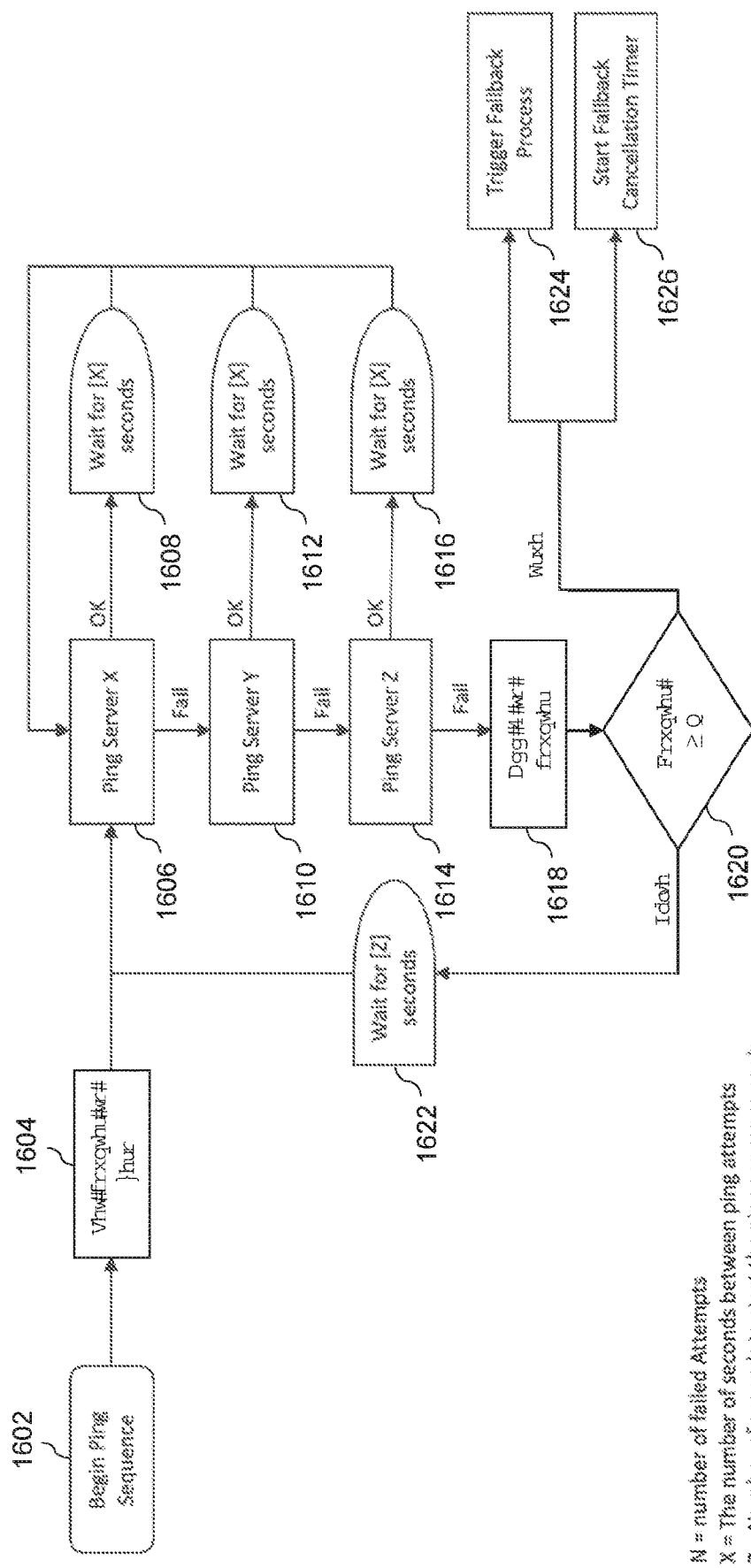
FIG. 16 is a flow diagram showing the ping connectivity test of FIG. 15 in greater detail.

The ping connectivity test is shown in greater detail in FIG. 16. The ping connectivity test begins, at Step 1602, where the Operational Profile is active. At Step 1604, the Applet (not shown) sets a counter to zero. Next, the Applet pings Server X, at Step 1606. If the Applet receives a ping response from Server X, the process moves to a wait state at which the Applet waits, at Step 1608, for [X] seconds, where [X] is a predetermined number which represents the number of seconds between repeat ping attempts to Server X. However, if the Applet does not receive a ping response from Server X, then the process continues and the Applet proceeds to ping Server Y, at Step 1610. If the Applet receives a ping response from Server Y, the process moves onto a wait state where the Applet waits, at Step 1612, for [X] seconds before re-pinging Server X, at Step 1606, and thereby restarting the ping sequence. However, if the Applet does not receive a ping response from Server Y, then the process continues and the Applet proceeds to ping Server Z, at Step 1614. Lastly, if the Applet receives a ping response from Server Z, the process moves onto a wait state where the Applet waits, at Step 1616, for [X] seconds before re-pinging Server X, at Step 1606, and thereby restarting the ping sequence. However, if the Applet does not receive a ping response from Server Z, then the process continues to add 1 to the counter at Step 1618.

The Applet then checks, at Step 1620, the value of counter to determine whether or not there have been [N] or more failed ping sequences, where [N] is a predetermined value which represents the number of failed ping sequences required in order for the Applet to trigger a Fallback process. Namely, the Applet checks whether the counter is greater than or equal to N. If the result of this check is negative, then the Applet waits, at Step 1622, for [Z] seconds, where [Z] is a predetermined number, which represents the number of seconds to wait before restarting the ping sequence. After [Z] seconds, the Applet restarts the ping sequence by pinging Server X at Step 1606. If the result of the check at Step 1620 is positive, i.e. if the counter is greater than or equal to N, then the Applet initiates the Fallback process, at Step 1624, and simultaneously starts, at Step 1626, the Fallback Cancellation timer. Steps 1624 and 1626 can be seen as analogous to Steps 902 and 904, respectively, of FIG. 9. The subsequent steps of FIGS. 9 and 10 therefore also apply in the present embodiment. It should be noted that in the process flow of FIG. 16, the Operational Profile of the eUICC is currently active. The ping connectivity test could also be carried out in an analogous manner if the Bootstrap Profile is active instead of the Operational Profile, e.g. after a Fallback process has already been carried out and the switch to the Bootstrap Profile has been made. The process flow in this case is described below with reference to FIG. 18.

Figure 17:
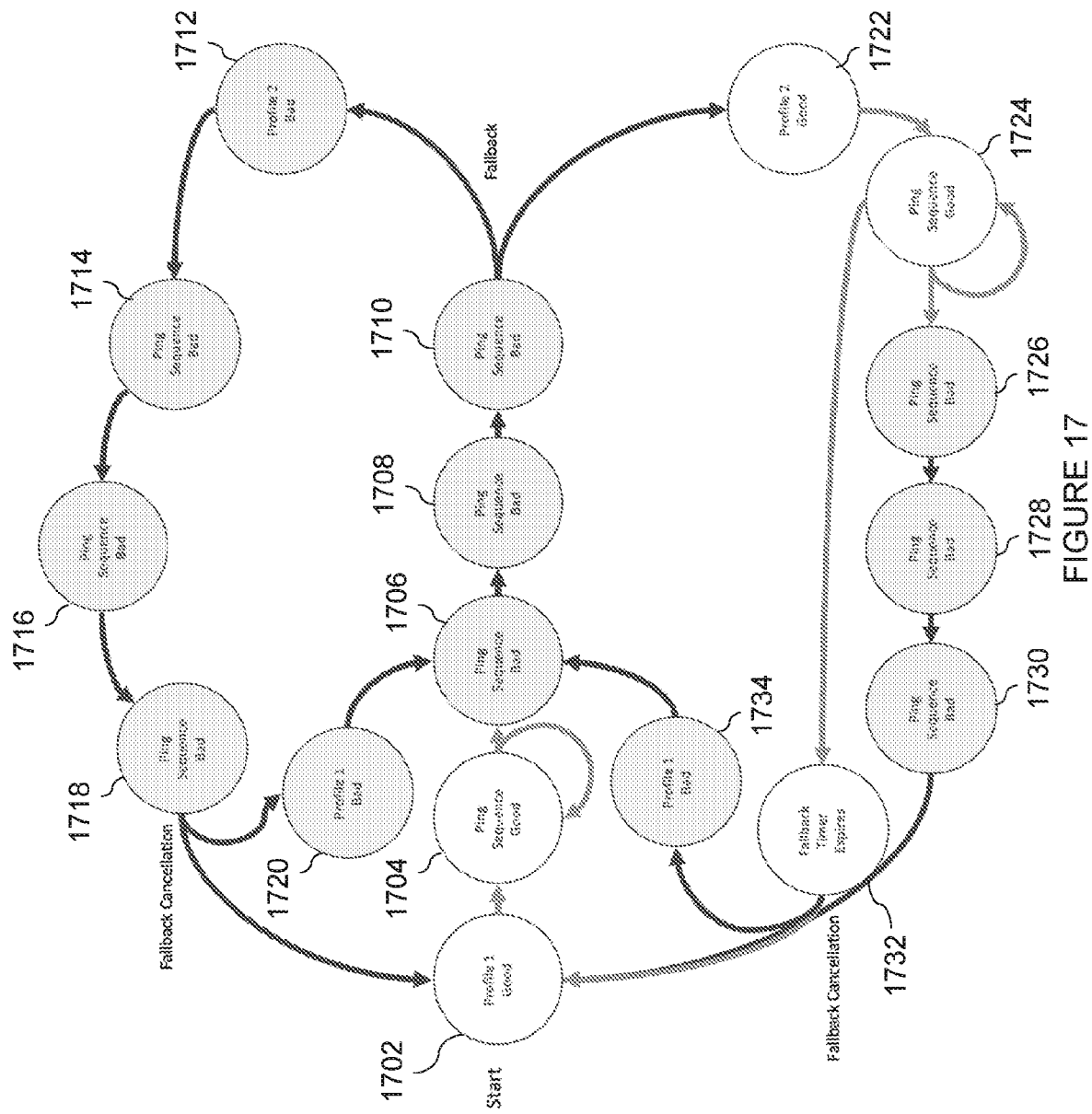
FIG. 17 is a schematic state machine diagram of the eUICC while carrying out the ping connectivity tests of FIGS. 15 and 16 and initiating the Fallback and Fallback Cancellation processes.

The Applet maintains a state machine while carrying out the ping connectivity tests and initiating the Fallback and Fallback Cancellation processes, as illustrated in FIG. 17. Different states of the state machine ensure that the eUICC stays connected. It should be noted that the states and process flows shown in FIG. 17 are for exemplary purposes only. At the beginning of the process, the eUICC uses an Operational Profile (Profile 1), which is associated with a first MNO network, MNO 1. At State 1702, the Applet records Profile 1 as 'Good' since it provides connectivity to the eUICC. The Applet tests the connectivity with the MNO 1 network by pinging Servers X, Y, Z to form a ping sequence. At State 1704, the Applet records a positive ping sequence, namely ping responses have been received from all three servers. The Applet then repeats the ping test. At State 1706, the Applet records a negative ping sequence, namely no ping responses have been received from the servers. The Applet repeats the ping test two more times and at State 1708 and State 1710 records a second and third negative ping sequence, respectively. The Applet confirms that there have been three consecutive negative ping sequences and initiates a Fallback process as a result. The Fallback process switches the profile that is currently active from the Operational Profile to the Bootstrap Profile (Profile 2), which is associated with a second MNO network, MNO 2. Simultaneously, a fallback cancellation timer is started.

Once the Fallback process has been carried out, the Applet can be in one of two states: a first state in which Profile 2 does not provide connectivity to the eUICC, at State 1712; and a second state in which Profile 2 does provide connectivity to the eUICC, at State 1722. Starting with State 1712 (no connectivity), the Applet continues to test connectivity to the MNO 2 network via Profile 2 using ping testing as described above. At States 1714, 1716 and 1718, the Applet records three consecutive negative ping sequences. The Applet confirms that there have been three consecutive negative ping sequences and initiates a Fallback Cancellation process as a result. The Fallback Cancellation process switches the profile that is currently active from the Bootstrap Profile (Profile 2) back to the Operational Profile (Profile 1), which is associated with the MNO 1 network. Once the Fallback Cancellation process has been carried out, the Applet can be in one of two states: a first state in which Profile 1 does not provide connectivity to the eUICC, at State 1720; and a second state in which Profile 1 does provide connectivity to the eUICC, at State 1702. In the event that no connectivity is recorded at State 1720, the Applet continues to test connectivity to the MNO 1 network via Profile 1 using ping testing and States 1706, 1708, 1710 are thus repeated. In the event that connectivity to the MNO 1 network via Profile 1 is recorded at State 1702, the Applet continues to test connectivity to the MNO 1 network via Profile 1 using ping testing and State 1704 is repeated.

Turning to State 1722, Profile 2 provides connectivity to the eUICC once the Fallback process has been carried out. The Applet continues to test connectivity to the MNO 2 network via Profile 2 using ping testing as described above. At State 1724, the Applet records a positive ping sequence. At this stage, the Applet is checking whether the fallback cancellation timer has expired. If it has expired, at State 1732 the Applet records expiry of the fallback cancellation timer and initiates a Fallback Cancellation process. Alternatively, if the fallback cancellation timer has not yet expired, then the Applet repeats the ping test. At States 1726, 1728 and 1730, the Applet records three consecutive negative ping sequences. The Applet confirms that there have been three consecutive negative ping sequences and initiates a Fallback Cancellation process as a result.

The Fallback Cancellation process switches the profile that is currently active from the Bootstrap Profile (Profile 2) back to the Operational Profile (Profile 1), which is associated with the MNO 1 network. Once the Fallback Cancellation process has been carried out, the Applet can be in one of two states: a first state in which Profile 1 does not provide connectivity to the eUICC, at State 1734; and a second state in which Profile 1 does provide connectivity to the eUICC, at State 1702. In the event that no connectivity is recorded at State 1734, the Applet continues to test connectivity to the MNO 1 network via Profile 1 using ping testing and States 1706, 1708, 1710 are thus repeated. In the event that connectivity to the MNO 1 network via Profile 1 is recorded at State 1702, the Applet continues to test connectivity to the MNO 1 network via Profile 1 using ping testing and State 1704 is repeated.

Figure 18:
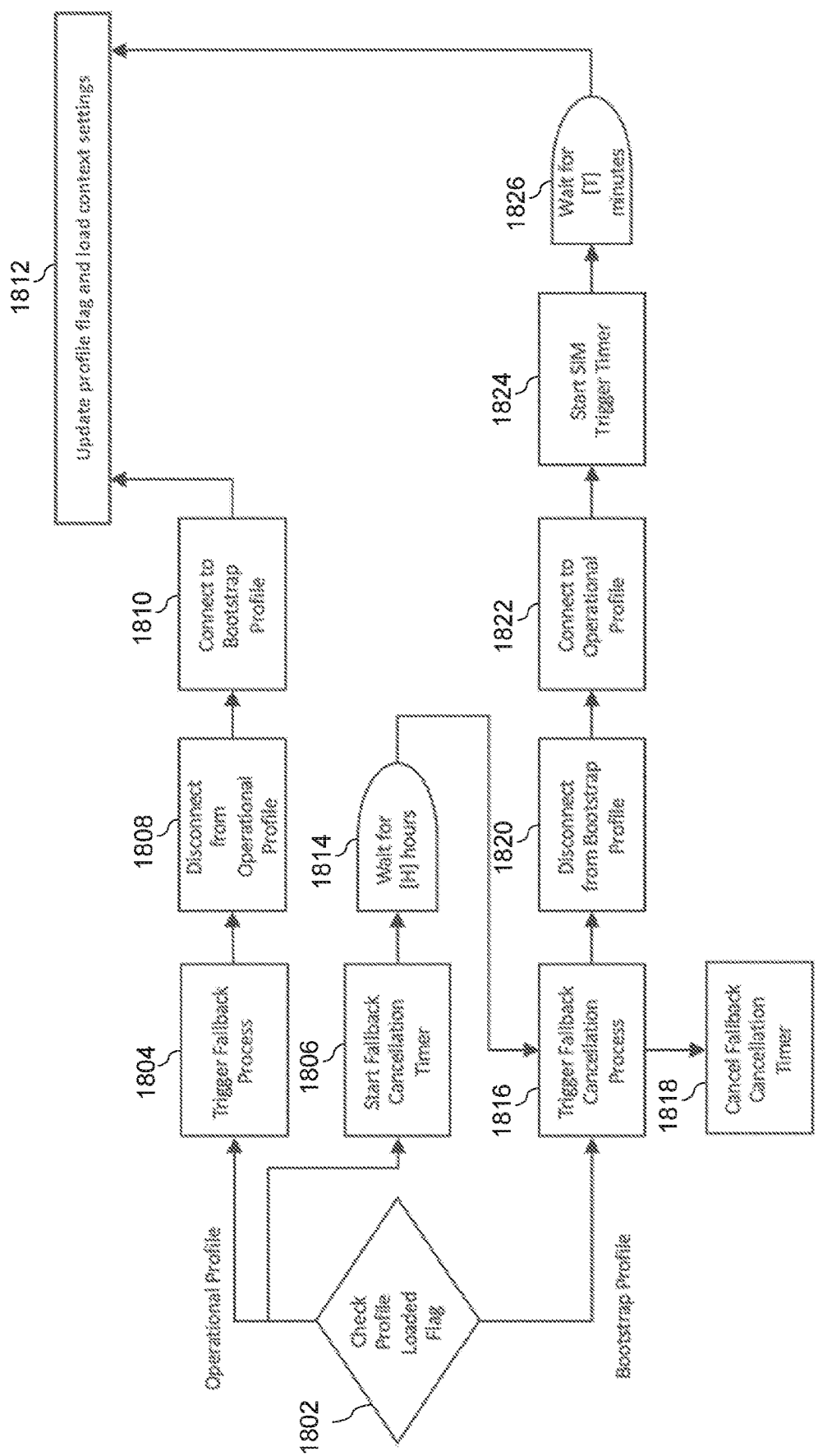
FIG. 18 is a flow diagram showing steps taken during the Fallback and Fallback Cancellation processes of FIGS. 9 and 10 in greater detail.

Turning to FIG. 18, the steps taken by the Applet during the Fallback and Fallback Cancellation processes are shown in greater detail. The process flow of FIG. 18 follows on from the process flow of FIG. 16 from a positive result of the check at Step 1618. Namely, if the result of the check at Step 1618 (FIG. 16) is positive, i.e. if the counter is greater than or equal to N, then the process continues to check, at Step 1802 (FIG. 18), the Profile Loaded Flag which indicates which profile is currently active in the eUICC. If the Profile Loaded Flag indicates that the Operational Profile is currently active, then the process proceeds to trigger at Step 1804, the Fallback process and simultaneously start, at Step 1806, the Fallback Cancellation timer. Steps 1804 and 1806 shown in FIG. 18 are, therefore, analogous to Steps 1624 and 1626 shown in FIG. 16.

After triggering the Fallback process, the Applet disconnects, at Step 1808, from the Operational Profile, and subsequently connects, at Step 1810, to the Bootstrap Profile. After the Applet has connected to the Bootstrap Profile, the Applet updates, at Step 1812, the Profile Loaded Flag to the Bootstrap Profile and loads the context settings of the Bootstrap Profile.

The Fallback Cancellation timer, which is started, at Step 1806, by the Applet is set for a predetermined amount of time, namely [H] hours. The Applet thus waits, at Step 1816, for [H] hours and once the time limit has been reached, the Applet triggers, at Step 1816, the Fallback Cancellation process. Once the Fallback Cancellation process has been triggered, the Applet cancels, at Step 1818, the Fallback Cancellation timer. The Fallback Cancellation process itself involves the Applet disconnecting, at Step 1820, from the Bootstrap Profile, and connecting, at Step 1822, to the Operational Profile. Next, the Applet starts, at Step 1824, a SIM trigger timer for a predetermined amount of time, namely [T] minutes. The SIM trigger timer ensures that the eUICC waits for a period of time after the Fallback Cancellation timer has expired and the Fallback Cancellation process is completed. This staggers the movement of eUICCs back to the Operational Profile (for example, by random delay periods) and corresponding MNO network in order to prevent a signalling storm as has been mentioned previously in other embodiments. At Step 1826, the Applet checks whether [T] minutes has been reached and then updates, at Step 1812, the Profile Loaded Flag to the Operational Profile and loads, also at Step 1812, the context settings of the Operational Profile.

At Step 1802, if the Profile Loaded Flag indicates that the Bootstrap Profile is currently active in the eUICC, then the process proceeds directly trigger, at Step 1816, the Fallback Cancellation process and switch to the Operational Profile.

FIG. 19 shows a table summarising the timings used by the Applet in the ping connectivity tests and Fallback and Fallback Cancellation processes for domestic and roaming profiles. Firstly, [N] 1902 is the number of failed ping sequence attempts required in order for the Applet to trigger a Fallback process. As shown in FIG. 16, the Applet checks whether the counter is greater than or equal to [N] to confirm whether the Fallback process should be triggered (see Step 1618).

Secondly, [X] 1904 is the number of seconds that the Applet waits between ping attempts during the connectivity test. As shown in FIG. 16, after pinging each of Servers X, Y and Z, the Applet waits for [X] seconds before continuing to re-ping Server X (see Steps 1608, 1612 and 1616).

Thirdly, [Z] 1906 is the number of seconds that the Applet waits before restarting a ping sequence. As shown in FIG. 16, after a ping sequence has been completed at the check at Step 1618 is negative, the Applet add 1 to the counter, then waits for [Z] seconds at Step 1622 before pinging Server X again to restart the ping sequence.

Fourthly, [H] 1908 is the number of hours that the Applet waits before triggering the Fallback Cancellation process. As shown in FIG. 18, the Fallback Cancellation timer is started at Step 1806 and the Applet waits for [H] hours at Step 1814, using the timer to monitor the amount of time that has passed, before triggering the Fallback Cancellation process at Step 1816.

Fifthly, [T] 1910 is the number of minutes that the Applet waits after the Fallback Cancellation timer expires and carrying out the Fallback Cancellation process. As shown in FIG. 18, the SIM trigger timer is used, at Step 1824, to monitor [T]. This staggers the movement of eUICCs back to the Operational Profile and corresponding MNO network in order to prevent a signalling storm.

Lastly, the total expected time before the Applet triggers the Fallback process is approximately [3] to [5] minutes where only domestic profiles are being used and [6] to [15] minutes where roaming profiles are being used as well as domestic profiles. In the case where roaming profiles are being used on the eUICC, the Applet does not interfere with the roaming process between MNOs and ensures that sufficient time is provided to allow the eUICC to disconnect from one MNO and roam and connect to another MNO, before triggering any Fallback process. Typically, there are three or four MNOs in a given country. The Applet therefore allows a configurable time between [3] and [15] minutes for the device and eUICC to cycle through the roaming MNOs. The time allowed varies on the critical nature of the service being delivered using the eUICC.

As discussed previously, the movement of eUICCs back to the Operational Profile over time after a Fallback Cancellation trigger helps to prevent a signalling storm and further outages. In some embodiments, the Applet uses a random number, for example this could be a digit taken from the ICCID (Integrated Circuit Card Identifier), IMEI (International Mobile Equipment Identity) of the host device, MISDIN (Mobile Station International Subscriber Directory Number) assigned by the network to the device, etc. and an associated time slot. The Applet prevents the Fallback Cancellation process from being carried out until the specific time slot associated with the random number is reached, namely it delays the Fallback Cancellation process. By way of example, if the ICCID number ended in 2, the allocated time slot would be 12 to 18 minutes after the initial Fallback Cancellation timer has expired. The Applet of the eUICC would therefore wait for 12 minutes after the initial Fallback Cancellation timer had expired before carrying out the Fallback Cancellation process.

One example of the determination of other possible timeslots using the last digit of the ICCID number is set out in FIG. 20. For example, if the last digit of the ICCID number is 4 (see 2002 in FIG. 20), the allocated time slot is the $24^{th}$ to $30^{th}$ minute (see 2004 in FIG. 20) after expiry of the Fallback Cancellation timer. In other embodiments a random digit of the ICCID number could be used instead.

Elements of the Applet can be configured via the context settings. These context settings provide the Applet with information about the environment, the way in which it is operating and the way it should perform tests and trigger events. The Applet can also be configured based on whether a domestic profile or roaming profile is being used. FIG. 21 shows a table summarising configurable elements of the Applet.

The total time 2102 allowed by the Applet to complete the ping sequence is configurable. In the present embodiment, this is set to 6 to 15 minutes for roaming profiles and 3 to 5 minutes for domestic profiles. Other configurable elements of the Applet include the ping sequence number 2104 and internet addresses of the corresponding ping servers 2106 for connectivity ping testing. These elements are especially important in the event that MNOs blacklist IP addresses preventing pinging of a particular server to take place, or in the event that a server is taken down, and the server being taken down would need to be replaced with an alternative. In addition, the ping test may suffer from latency if the server is located in Europe and the eUICC is being used in Australia, accidentally triggering a Fallback process.

Furthermore, parameters used by the Applet can be configured such as the timing between ping sequences 2108 (equivalent to [X], the number of failed ping sequence attempts before triggering the Fallback process 2110 (equivalent to [N]), and the latency on the ping 2112, namely the time taken for the ping to return, before it is considered as a failed ping.

Figure 22:
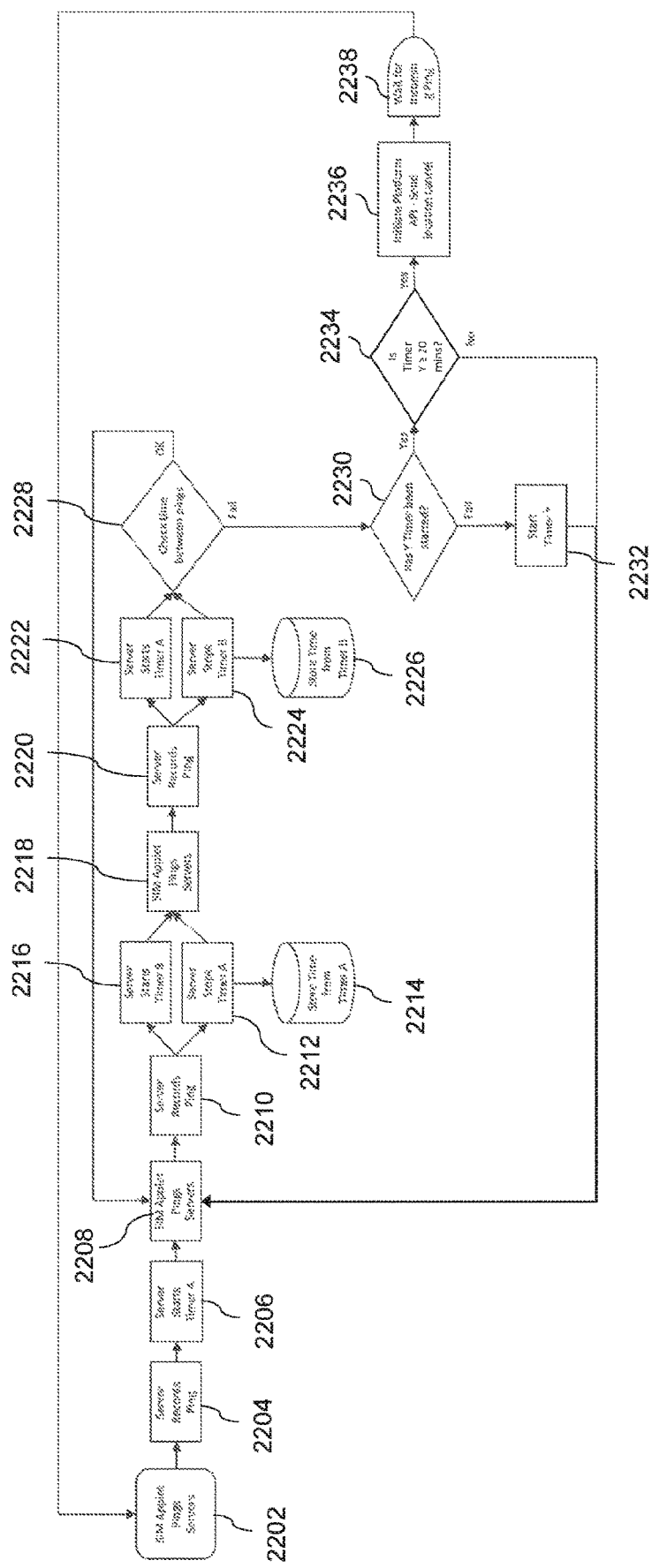
FIG. 22 is a flow diagram showing the process for Applet and Platform Synchronisation and the triggering of the Location Cancel request, in accordance with a further embodiment.

'Applet and Platform Synchronisation' provides real-time information directly from the Applet to the MNO platform. If the MNO platform fails to receive pings from the Applet, then it can automate a request to the MNO network's Visitor Location Record (VLR) to reset the connection to the eUICC. This request is referred to herein as a 'Location Cancel' request. FIG. 22 illustrates the process for Applet and Platform Synchronisation and the triggering of the Location Cancel request.

Firstly, the Applet pings, at Step 2202, a server on the MNO platform. The server then records, at Step 2204, the received ping and subsequently, the server starts, at Step 2206, Timer A. The Applet then pings, at Step 2208, the server again and the server records this second ping, at Step 2210. Once the second ping has been recorded, the server starts Timer B, at Step 2216, while simultaneously stopping Timer A, at Step 2214. The server stores, at Step 2214, the time from Timer A in a database associated with the server. The stored time from Timer A therefore represents the amount of time between the first and second pings being recorded by the server. Next, the Applet pings, at Step 2218, the server a third time and the server records this third ping at Step 2220. Once the third ping has been recorded, the server re-starts Timer A, at Step 2222, while simultaneously stopping Timer B, at Step 2224. The server stores at Step 2226, the time from Timer B in a database associated with the server. The stored time from Timer B therefore represents the amount of time between the second and third pings being recorded by the server.

The process continues by the server checking, at Step 2228, the time between pings against a predetermined time threshold. Namely, the server checks the stored time from Timer A for the time between the first and second pings, and the stored time from Timer B for the time between the second and third pings. If either Timer A or Timer B is less that the predetermined threshold, this check is passed and the process loops back to re-ping the server, at Step 2208, from the second ping, namely without server intervention. If, however, the time between pings fails this check, indicating that pings are not arriving at the server in time (namely that the time between pings is greater than the predetermined time threshold), then the server checks, at Step 2230, whether Timer Y has been started.

If not already started, the server starts Timer Y at Step 2232. If Timer Y has been started, then the server checks, at Step 2234, whether Timer Y is greater than or equal to 20 minutes. If the result of this check is negative, namely if Timer Y is less than 20 minutes, then the process loops back to re-ping the server, at Step 2208, from the second ping. If the result of the check at Step 2234 is positive, namely if Timer Y is greater than or equal to 20 minutes, then the server calls, at Step 2236, on an API in the MNO platform to send a Location Cancel request to the MNO network's VLR to reset the connection to the eUICC.

The Location Cancel request is a request for the MNO network to remove the eUICC from the MNO network. This forces the eUICC to re-start the connection to the MNO, effectively resetting the connection to the eUICC. Then the server waits, at Step 2238, for an incoming ping, then restarts the process from Step 2202. The time waited for by the server at this step is configurable, but is typically about 10 minutes. If the server does not receive an incoming ping, then this can provide an indication that the device and/or eUICC has powered down and/or malfunctioned.

The connection to the eUICC could be reset in this manner before the Fallback process is initiated. For example, the eUICC may be experiencing connectivity issues whilst on the Operational Profile. Simply resetting the connection based on the Location Cancel request may be enough to fix any connectivity issues. Alternatively, the connection could be re-started after the Fallback process has been initiated. For example, after the eUICC has switched from the Operational Profile to the Bootstrap Profile, it may remain offline due to an issue with the MNO network such as network congestion or because the radio module needs to be reset. Resetting the connection to the eUICC after the Fallback process has been initiated may have the effect of resolving any network issues and/or resetting the radio module on the device which was stuck or had crashed, thereby enabling the eUICC to reconnect.

Furthermore, the Applet and Platform Synchronisation can provide the Network Operations Centre warning of a widescale issue on the network, which they can then start to resolve with the MNO before the Fallback process is initiated. It also allows for automated alerting to customers to an imminent change of network on their eUICCs.

It should be noted that, although pinging is used as the connectivity test in embodiments of the present invention, alternative connectivity tests may be used in any embodiments of the present invention to identify a potential issue. The Applet may use a number of alternative end-to-end connectivity and service testing methods to test the connectivity. The alternative testing methods include, at least, but not exclusively one or more of the following: Address Resolution Protocol (ARP) pinging; data delivery, e.g. can the SIM deliver [10] kb of data to a server; speed tests; and/or testing one or multiple networks layers, e.g. Layer 1—Physical; Layer 2—Data Link Layer; Layer 3—Network Layer; Layer 4—Transport Layer; Layer 5—Session Layer; Layer 6—Presentation Layer; Layer 7—Application.

Figure 23:
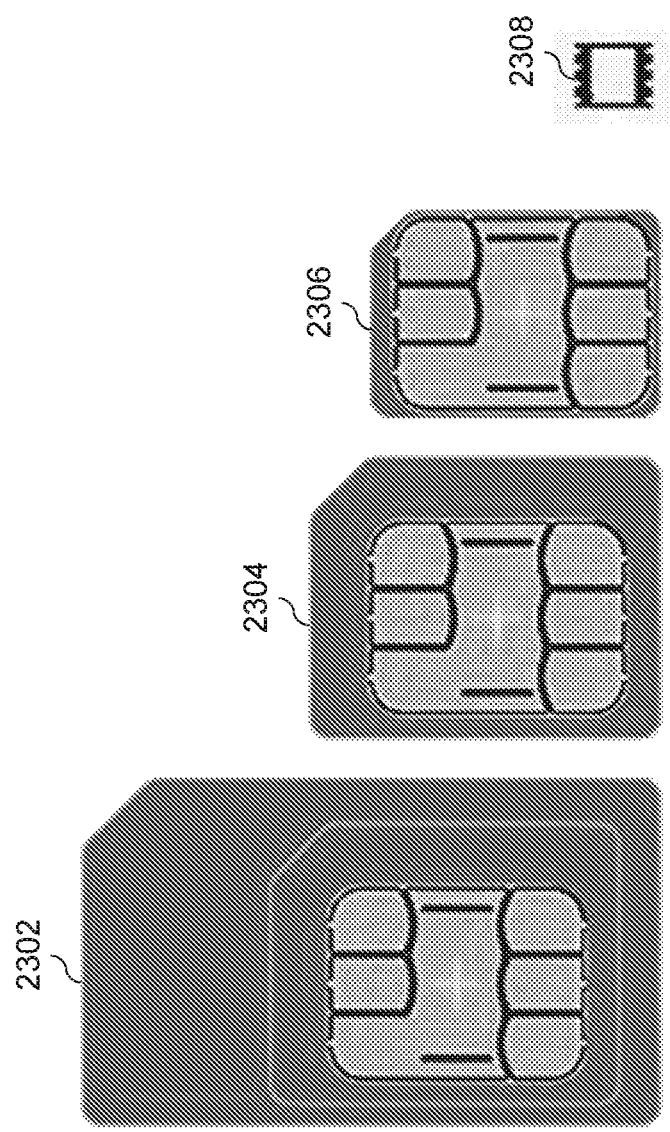
FIG. 23 is a schematic diagram showing examples of SIMs that are compatible with embodiments of the present invention.

It should also be noted that, although embodiments of the present invention are described with respect to the Applet being implemented on an eUICC, the Applet may be installed on any compatible SIM (namely any UICC) and any SIM card format may be used. Examples of compatible SIMs are shown in FIG. 23. In particular, any of the following SIM types may be used: 2FF Mini SIM (25 mm×15 mm×0.76 mm) 2302; 3FF Micro SIM (15 mm×12 mm×0.76 mm) 2304; 4FF Nano SIM (12.3 mm×8.8 mm×0.67 mm) 2306; and MFF2 solderable SIM 2308, as shown in FIG. 23.

It should further be noted that the Applet is capable of working on SIM cards manufactured from any SIM vendor including, but not limited to, Gemalto. Thales, Giesecke & Devrient, Idemia (Morpho and Oberthur Technologies), Bluefish, Datang, and DZCARD.

It should yet further be noted that, although embodiments of the present invention are described in respect of the eUICC being installed within an alarm device, the eUICC may be installed in any device which requires radio network connectivity. For example, the eUICC may be installed in smartphones, tablets, dangles, routers, GPS tracking devices, M2M devices, IoT devices, vehicles or telehealth and telecare devices.

It should also be noted that embodiments of the present invention can be used with various MNO platforms, including, but not limited to, Cisco Jasper, Ericsson DCP, Vodafone GDSP, Nokia Wing, Huawei IoT Connection Management Platform and Orange Platform.

Features of one embodiment may also be used in other embodiments, either as an addition to such embodiment or as a replacement thereof.

The invention claimed is:

1. A universal integrated circuit card (UICC) for controlling radio communications via a radio communications network to and from a host device in which the UICC is installed in use, the UICC comprising:
    a microprocessor for controlling the operation of the UICC;
    a data store for storing data relating to the operation of the UICC, the data store comprising:
    a plurality of mobile operator network profiles including:
    an operational profile comprising radio communications network settings for connecting the host device to a first radio communications network; and
    a bootstrap profile comprising radio communications network settings for connecting the host device to a second radio communications network; and
    a program comprising a plurality of instructions for configuring operation of the UICC;
    wherein, in use, the microprocessor is configured by the program to:
    use the operational profile to connect the host device to the first radio communications network;
    detect a loss of operational connectivity with the first radio communications network; and
    use the bootstrap profile to connect the host device to the second radio communications network to re-establish radio communications to and from the host device;
    start a cancellation timer, for a predetermined time period when a loss of connection on the first network has been detected; and
    deselect the bootstrap profile and re-select the operational profile once the cancellation timer is completed, and use the operational profile to re-connect to the first radio communications network in order to re-establish radio communications network connectivity between the host device and the first radio communications network.

2. The UICC of claim 1, wherein the UICC is an embedded UICC (eUICC) which enables the program and profiles to be configured and/or updated remotely.

3. The UICC of claim 1, wherein the program comprises an applet having a relatively small size and dedicated functionality.

4. The UICC of any preceding claim 1, wherein the data store is provided in a secure transversal domain of the UICC and the operational profile or the bootstrap profile is able to securely provide access to the secure transversal domain of the UICC to allow an external server to make changes to the program stored therein.

5. The UICC of any preceding claim 1, further comprising a set of variable parameters stored as files in the data store for configuring the operational and bootstrap profiles and their use in controlling radio communications via the radio communications network to and from the host device.

6. The UICC of any preceding claim 1, wherein the program comprises instructions for configuring the microprocessor in use to:
    perform a first radio communications network connectivity test to test the radio communications network connectivity between the host device and the first radio communications network and return a first connectivity test result based on the radio communications network connectivity test;

determine, based on the first connectivity test result, when a loss of radio communications network connectivity has occurred between the host device and the first radio communications network; and when such a loss of connection has been determined, deselect the operational profile and select the bootstrap profile and use the bootstrap profile to connect to the second radio communications network based on the network settings of the bootstrap profile in order to re-establish radio communications network connectivity to the host device.

7. The UICC of any preceding claim 1, wherein the program comprises instructions for configuring the microprocessor in use to:

perform, following use of the bootstrap profile to connect the host device to the second radio communications network, a second radio communications network connectivity test to test the radio communications network connectivity between the host device and the second radio communications network; and return a second connectivity test result based on the radio communications network connectivity test;

determine, based on the second connectivity test result, when a loss of radio communications network connectivity has occurred between the host device and the second radio communications network; and when such a loss of connection has been determined, to deselect the bootstrap profile and re-select the operational profile and use the operational profile to connect to the first radio communications network based on the network settings of the operational profile in order to re-establish radio communications network connectivity to the host device.

8. The UICC of claim 7, wherein the program comprises instructions for configuring the microprocessor, in use, to perform the first or the second radio communications network connectivity test by testing the radio communications network connectivity between the host device and one or more test servers within the radio communications network being tested.

9. The UICC of claim 8, wherein the program comprises instructions for configuring the microprocessor in use to perform the first or second radio communications network connectivity test by performing a ping test, wherein the ping test comprises:

sending, to a test server of the one or more test servers, a forward data packet;

determining whether a response data packet is received from the test server; and returning a negative first or second radio communications network connectivity test result when the response data packet is not received from the test server within a predetermined time period from sending the forward data packet.

10. The UICC of claim 8, wherein the program comprises instructions for configuring the microprocessor in use to perform the first or second radio communications network connectivity test by performing a ping sequence test, wherein the ping sequence test comprises:

sending, to a first test server of the one or more test servers, a first forward data packet;

determining whether a first response data packet is received from the first test server within a first predetermined time period;

sending, to a second test server of the one or more test servers, a second forward data packet, when it is determined that the first response data packet is not received within the first predetermined time period;

determining whether a second response data packet is received from the second test server within a second predetermined time period;

sending, to a third test server of the one or more test servers, a third forward data packet, when it is determined that that the second response data packet is not received within the second predetermined time period;

determining whether the third response data packet is received from the third test server within a third predetermined time period;

returning a negative ping sequence test result when it is determined that the third response data packet is not received within the third predetermined time period;

returning a negative first or second radio communications network connectivity test result when the negative sequence ping result is returned.

11. The UICC of claim 10, wherein the program comprises instructions for configuring the microprocessor in use to perform the first or second radio communications network connectivity test by repeating the ping sequence test one or more times; and wherein the negative radio communications network connectivity test result is returned only when the number of consecutive negative ping sequence test results exceeds a predetermined threshold.

12. The UICC of claim 8, wherein the program comprises instructions for configuring the microprocessor in use to perform the first or second radio communications network connectivity test by performing a data test, wherein the data test comprises:

sending, to a test sever, a predetermined amount of data; determining whether the predetermined amount of data has been delivered to the test server; and returning a negative first or second radio communications network connectivity test result in the event that the predetermined amount of data has not been delivered to the test server.

13. The UICC of claim 8, wherein the program comprises instructions for configuring the microprocessor in use to perform the first or second radio communications network connectivity test by performing a network layer test, wherein the network layer test comprises: testing different network layers of the first or second radio communications network.

14. The UICC of claim 1, wherein the program comprises instructions for configuring the microprocessor in use to:

determine a time slot for using the re-selected operational profile; and delay the disconnection from the second radio communications network and use of the re-selected operational profile to connect to the first radio communications network until the time slot is reached.

15. The UICC of claim 14, wherein the time slot is determined using a random number or a digit taken from an ICCID, IMEI, or MISDIN associated with the UICC or host device.

16. The UICC of claim 1, wherein the data store comprises a roaming profile comprising radio communications network settings for connecting the host device to a roaming radio communications network; and the program comprises instructions for configuring the microprocessor in use, after detecting the loss of operational connectivity with the first communications network, to use the roaming profile to connect the host device to the roaming radio communications network based on the network settings of the roaming profile in order to re-establish radio communications to and from the host device.

17. The UICC of claim 1, wherein
the data store comprises a plurality of radio network profiles, each comprising radio communications network settings for connecting the host device to a respective radio communications network; and
the UICC is configured to enable remote selection of the operational profile and the bootstrap profile from the plurality of profiles.

18. The UICC of claim 17, wherein each radio network profile in the plurality of radio network profiles is associated with a different independent radio communications network.

19. The UICC of claim 17, wherein each network profile in the plurality of network profiles is associated with an independent radio communications network platform or a different instance of the same radio communications network platform.

20. The UICC of claim 1, wherein
the data store comprises a plurality of radio network profiles, each comprising radio communications network settings for connecting the host device to a respective radio communications network; and
the UICC is configured to enable local user selection of the operational profile and the bootstrap profile from the plurality of profiles.

21. The UICC of claim 1, wherein the UICC comprises an eUICC, a Mini SIM, a Micro SIM, a Nano SIM or a Solderable SIM.

22. A host device comprising a processor having a memory, a radio module for connecting the host device to a radio communications network, and the universal integrated circuit device of claim 1.

23. The host device of claim 22, wherein the host device comprises an alarm device, a smart phone, a tablet computer, a dongle, a router, a GPS tracking device, an M2M device, an IoT device, a vehicle, a telehealth device or a telecare device.

24. A method of operating a universal integrated circuit card (UICC) for controlling radio communications via a radio communications network to and from a host device in which the UICC is installed in use, the method comprising:
providing access to data relating to the operation of the UICC stored in a data store of the UICC, the data including a plurality of mobile operator network profiles including:
an operational profile comprising radio communications network settings for connecting the host device to a first radio communications network; and
a bootstrap profile comprising radio communications network settings for connecting the host device to a second radio communications network; and
controlling the operation of the UICC using a microprocessor of the UICC and a program comprising a plurality of instructions for configuring operation of the UICC; the controlling step comprising:
connecting the host device to the first radio communications network using the operational profile,
detecting a loss of operational connectivity with the first radio communications network; and
connecting the host device to the second radio communications network using the bootstrap profile, to re-establish radio communications to and from the host device;
starting a cancellation timer, for a predetermined time period when a loss of connection on the first network has been detected; and
deselecting the bootstrap profile and re-select the operational profile once the cancellation timer is completed, and using the operational profile to re-connect to the first radio communications network in order to re-establish radio communications network connectivity between the host device and the first radio communications network.

25. A non-transitory computer-readable storage medium comprising instructions which, when executed by a computer, cause the computer to perform the method claim 24.

26. A universal integrated circuit card (UICC) for controlling radio communications via a radio communications network to and from a host device in which the UICC is installed in use, the UICC comprising:
a microprocessor for controlling the operation of the UICC;
a data store for storing data relating to the operation of the UICC, the data store comprising:
a plurality of mobile operator network profiles including:
an operational profile comprising radio communications network settings for connecting the host device to a first radio communications network; and
a bootstrap profile comprising radio communications network settings for connecting the host device to a second radio communications network; and
a program comprising a plurality of instructions for configuring operation of the UICC; wherein, in use, the microprocessor is configured by the program to:
use the operational profile to connect the host device to the first radio communications network;
detect a loss of operational connectivity with the first radio communications network;
use the bootstrap profile to connect the host device to the second radio communications network to re-establish radio communications to and from the host device;
perform, following use of the bootstrap profile to connect the host device to the second radio communications network, a second radio communications network connectivity test to test the radio communications network connectivity between the host device and the second radio communications network; and return a second connectivity test result based on the radio communications network connectivity test;
determine, based on the second connectivity test result, when a loss of radio communications network connectivity has occurred between the host device and the second radio communications network; and
when such a loss of connection has been determined, to deselect the bootstrap profile and re-select the operational profile and use the operational profile to connect to the first radio communications network based on the network settings of the operational profile in order to re-establish radio communications network connectivity to the host device.

* * * * *